US012111614B2

(12) United States Patent
Hiramatsu et al.

(10) Patent No.: US 12,111,614 B2
(45) Date of Patent: Oct. 8, 2024

(54) TONER

(71) Applicant: CANON KABUSHIKI KAISHA, Tokyo (JP)

(72) Inventors: Tohru Hiramatsu, Shizuoka (JP); Tomohisa Sano, Shizuoka (JP); Kazuyuki Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 531 days.

(21) Appl. No.: 17/530,670

(22) Filed: Nov. 19, 2021

(65) Prior Publication Data

US 2022/0171303 A1 Jun. 2, 2022

(30) Foreign Application Priority Data

Nov. 30, 2020 (JP) ................................ 2020-199143

(51) Int. Cl.
*G03G 9/083* (2006.01)
*G03G 9/087* (2006.01)

(52) U.S. Cl.
CPC ......... *G03G 9/0836* (2013.01); *G03G 9/0833* (2013.01); *G03G 9/08708* (2013.01); *G03G 9/08755* (2013.01)

(58) Field of Classification Search
CPC ............... G03G 9/0836; G03G 9/0833; G03G 9/08708; G03G 9/08755; G03G 9/0821; G03G 9/0839; G03G 9/08797; G03G 9/09716; G03G 9/083; G03G 9/087
See application file for complete search history.

(56) References Cited

U.S. PATENT DOCUMENTS

| | | | |
|---|---|---|---|
| 7,123,862 | B2 | 10/2006 | Hasegawa et al. |
| 7,582,401 | B2 | 9/2009 | Ogawa et al. |
| 7,678,523 | B2 | 3/2010 | Hiroko et al. |
| 7,678,524 | B2 | 3/2010 | Hasegawa et al. |
| 7,923,190 | B2 | 4/2011 | Magome et al. |
| 7,935,467 | B2 | 5/2011 | Dojo et al. |
| 8,227,162 | B2 | 7/2012 | Sano et al. |
| 8,426,091 | B2 | 4/2013 | Magome et al. |
| 8,426,094 | B2 | 4/2013 | Magome et al. |
| 8,518,620 | B2 | 8/2013 | Dojo et al. |
| 8,614,044 | B2 | 12/2013 | Matsui et al. |
| 8,778,585 | B2 | 7/2014 | Matsui et al. |

(Continued)

FOREIGN PATENT DOCUMENTS

| | | | |
|---|---|---|---|
| EP | 1 128 225 | A2 | 8/2001 |
| JP | 10-213921 | A | 8/1998 |

(Continued)

OTHER PUBLICATIONS

Fedors, A method for estimating both the solubility parameters and molar volumes of liquids, Poly. Eng. Sci., vol. 14, No. 2 (1974) 147-54.

(Continued)

*Primary Examiner* — Stewart A Fraser
(74) *Attorney, Agent, or Firm* — VENABLE LLP

(57) ABSTRACT

There is provided a toner containing: a toner particle containing a binder resin, a releasing agent, and a colorant; and an iron oxide particle present on a surface of the toner particle, in which the iron oxide particle has a surface containing a compound having a specific structure.

8 Claims, 2 Drawing Sheets

(56) References Cited

U.S. PATENT DOCUMENTS

| | | | |
|---|---|---|---|
| 8,841,054 | B2 | 9/2014 | Dojo et al. |
| 9,152,065 | B2 | 10/2015 | Sano et al. |
| 9,235,151 | B2 | 1/2016 | Tanaka et al. |
| 9,377,708 | B2 | 6/2016 | Magome et al. |
| 9,551,947 | B2 | 1/2017 | Hiroko et al. |
| 9,804,514 | B2 | 10/2017 | Suzumura et al. |
| 9,804,519 | B2 | 10/2017 | Suzumura et al. |
| 9,841,692 | B2 | 12/2017 | Hasegawa et al. |
| 9,880,478 | B2 | 1/2018 | Shimano et al. |
| 9,927,728 | B2 | 3/2018 | Arimura et al. |
| 9,946,179 | B2 | 4/2018 | Arimura et al. |
| 9,946,181 | B2 | 4/2018 | Hasegawa et al. |
| 9,964,874 | B2 | 5/2018 | Suzumura et al. |
| 9,964,881 | B2 | 5/2018 | Ikejiri et al. |
| 9,971,262 | B2 | 5/2018 | Hasegawa et al. |
| 9,971,264 | B2 | 5/2018 | Sano et al. |
| 10,012,923 | B2 | 7/2018 | Sano et al. |
| 10,151,990 | B2 | 12/2018 | Suzuki et al. |
| 10,228,627 | B2 | 3/2019 | Nagashima et al. |
| 10,295,920 | B2 | 5/2019 | Nishikawa et al. |
| 10,303,075 | B2 | 5/2019 | Tanaka et al. |
| 10,310,397 | B2 | 6/2019 | Sano et al. |
| 10,545,420 | B2 | 1/2020 | Kinumatsu et al. |
| 10,698,327 | B2 | 6/2020 | Nagashima et al. |
| 11,079,695 | B2 | 8/2021 | Sato et al. |
| 11,099,493 | B2 | 8/2021 | Komiya et al. |
| 11,181,844 | B2 | 11/2021 | Nagaoka et al. |
| 2005/0209364 | A1 | 9/2005 | Yamagishi et al. |
| 2006/0121379 | A1 | 6/2006 | Dojo et al. |
| 2007/0238043 | A1 | 10/2007 | Otake |
| 2009/0197192 | A1 | 8/2009 | Hiroko et al. |
| 2016/0378003 | A1 | 12/2016 | Arimura et al. |
| 2017/0277051 | A1* | 9/2017 | Arimura ............ G03G 9/08755 |
| 2022/0026822 | A1 | 1/2022 | Sato et al. |
| 2022/0026823 | A1 | 1/2022 | Sano et al. |

FOREIGN PATENT DOCUMENTS

| | | | |
|---|---|---|---|
| JP | 2000-214625 | A | 8/2000 |
| JP | 2002-202628 | A | 7/2002 |
| JP | 2005-37744 | A | 2/2005 |
| JP | 2005-263619 | A | 9/2005 |
| JP | 2007-15991 | A | 1/2007 |
| JP | 2011-20910 | A | 2/2011 |
| JP | 2012-173668 | A | 9/2012 |
| JP | 2015-227929 | A | 12/2015 |
| JP | 2017-40845 | A | 2/2017 |
| JP | 2017-207680 | A | 11/2017 |
| WO | 2015/016381 | A1 | 2/2015 |

OTHER PUBLICATIONS

"Evaporation Energies and Molar Volumes (25° C.) of Atoms and Atom Groups," Basic Coating Science, Table 3-9 (1986) 54-7 (Maki Shoten K.K.).

U.S. Appl. No. 17/524,353, Kazuyuki Sato, filed Nov. 11, 2021.

* cited by examiner

TONER

BACKGROUND OF THE INVENTION

Field of the Invention

The present invention relates to a toner used in a recording method using an electrophotographic method or the like.

Description of the Related Art

In recent years, an image forming apparatus such as a copier or a printer has been diversified in intended uses and use environments and has been required to be improved in higher speed, higher image quality, and higher stability. In addition, a copier or a printer has been downsized or improved in energy saving at the same time. Therefore, a magnetic monocomponent developing system that uses a magnetic toner useful in these points is preferably used.

The electrophotographic method includes a charging step of charging an electrostatic latent image-bearing member (hereinafter, referred to as a photosensitive member) by a charging unit, an exposing step of exposing the charged photosensitive member to form an electrostatic latent image, and a development step of developing the electrostatic latent image with a toner to form a toner image. Next, the toner image is output as an image through a transfer step of transferring the toner image onto a recording material via or without an intermediate transfer body and a fixing step of heating and pressure-fixing the toner image by passing the recording material carrying the toner image through a nip portion formed by a pressure member and a rotatable image heating member. In particular, in the magnetic monocomponent developing system, development is performed by storing a magnetic toner using a toner carrier (hereinafter, referred to as a sleeve) provided with a magnetic field generation unit such as a magnetic roll and transporting the magnetic toner to a development region.

In recent years, in order to cope with high image quality and energy saving, optimization of each step became important. In order to improve the image quality, it is conventionally important to optimize a development step of developing an electrostatic latent image with a toner to form a toner image and a transfer step of transferring the toner image from the photosensitive member to a recording material. In addition, in order to improve energy saving, it is important to perform sufficient fixing at a low temperature.

Considering problems related to the transfer step, a transfer defect may be an example of an image defect occurring when there are problems during transfer. In the transfer step, a transfer bias is applied to the toner on the photosensitive member and the toner is transferred onto a recording medium by an electrostatic attractive force. At this time, the toner may remain on the photosensitive member without being transferred, or a toner layer may be disturbed during transfer, and thus, a defect or unevenness on the image may occur. This phenomenon is called a transfer defect.

Hitherto, in order to improve transferability, attempts have been made to take measures by externally adding an iron oxide particle in toner production while suppressing a decrease in flowability of the toner (Japanese Patent Application Laid-Open No. 2000-214625 and Japanese Patent Application Laid-Open No. 2005-37744).

However, in Japanese Patent Application Laid-Open No. 2000-214625 and Japanese Patent Application Laid-Open No. 2005-37744, there are still room for studies on compatibility between transferability and fixability.

Specifically, in the toners described in Japanese Patent Application Laid-Open No. 2000-214625 and Japanese Patent Application Laid-Open No. 2005-37744, a sufficient release performance is not obtained, member-staining may occur in the pressure member, the image heating member, or the like in the fixing step, which may cause an image defect.

In addition, in a state where a rubbing pressure is applied to a fixed image, such as erasing characters written with an eraser, the toner of the fixed image may be peeled off from a paper.

SUMMARY OF THE INVENTION

The present invention has been made in view of the above problems.

That is, an object of the present invention is to provide a toner that can improve a release performance in a fixing step and suppress member-staining and has a small peeling amount from an image and excellent rubbing fixability.

As a result of conducting intensive studies, the present inventors found that the above problems can be solved by the following toner according to the present invention.

That is, the toner according to the present invention is a toner containing: a toner particle containing a binder resin, a releasing agent, and a colorant; and an iron oxide particle present on a surface of the toner particle, in which the iron oxide particle has a surface containing a compound having a structure represented by the following Formula (1), $$R\text{—}SiO_{3/2} \quad (1)$$

wherein, R represents a hydrocarbon group having 1 or more carbon atoms.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, the present invention will be described in detail, but the present invention is not limited thereto.

A toner according to the present invention is a toner containing: a toner particle containing a binder resin, a releasing agent, and a colorant; and an iron oxide particle present on a surface of the toner particle, in which the iron oxide particle has a surface containing a compound having a structure represented by the following Formula (1), $$R\text{—}SiO_{3/2} \quad (1)$$

wherein, R represents a hydrocarbon group having 1 or more carbon atoms.

In a transfer step, the toner is charged to a positive or negative polarity between a photosensitive member and a recording medium, and a reverse polarity bias is applied to a transfer material on a back surface of the recording medium. It is considered that creeping discharge along the surface of the toner particle occurs in the transfer step because the charged toner particles are deposited into several layers.

In a case where strong creeping discharge occurs, the toner tends to be an inversion component due to distortion of charge, which may cause "re-transfer" in which the toner on the recording medium returns onto the photosensitive member. For example, when re-transfer frequently occurs at the time of outputting a solid black image, a transfer defect becomes remarkable, and a non-uniform image is formed.

That is, in order to suppress the transfer defect, it is required to suppress creeping discharge along the surface of the toner.

Figure 1:
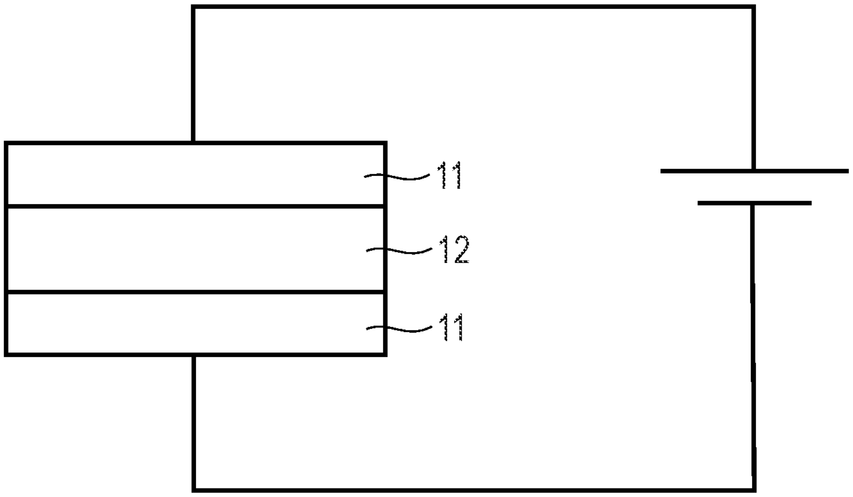
FIG. 1 is a view illustrating a capacitor model.

Here, in consideration of discharge, a capacitor model as illustrated in FIG. 1 in which a photosensitive member and a transfer material on a back surface of a recording medium are used for an electrode plate is conceivable. Assuming that a dielectric 12 between electrodes 11 is a toner and a capacitance thereof is C, C is expressed by the following equation.

$$C=\varepsilon S/d$$

Wherein, S represents an area of one electrode plate, d represents a distance between the electrode plates, and c represents a dielectric constant of the dielectric between the electrode plates.

Discharge occurs when an electric field applied between the electrodes 11 is large and the capacitance C of the dielectric 12 of FIG. 1 is small.

According to the above equation, the capacitance C is proportional to the dielectric constant c of the toner as a dielectric. Accordingly, a toner having a high dielectric constant c is expected to have an effect of reducing the frequency of discharge. Based on this idea, as a result of conducting intensive studies from the viewpoint of a substance having a high dielectric constant, the present inventors found that a remarkable effect can be obtained in a case where an iron oxide particle is present on the surface of the toner. It is considered that the reason for this is that the presence of the iron oxide particle having a high dielectric constant on the surface of the toner makes it difficult for creeping discharge to occur on the surface of the toner particle.

On the other hand, the present inventors found that in a case where the iron oxide particle is present on the surface of the toner, member-staining occur in a pressure member, an image heating member, or the like in the fixing step, which may cause an image defect. It is presumed that this is due to the following reasons.

In the case of externally adding the iron oxide particle, transferability is improved, but the surface of the iron oxide particle is hydrophilic, such that the affinity with the releasing agent in the toner is low, and in the fixing step, the releasing agent does not easily exude around the externally added iron oxide particle.

In general, in the fixing step, a releasing agent having a high sharp melt property exudes on an image surface. At this time, when an iron oxide particle having low affinity with the releasing agent is present on the surface of the toner, the releasing agent is repelled, such that a region where a part of the image surface is not covered with the releasing agent is formed. Therefore, it is considered that the release effect is not sufficiently exhibited in the fixing step, resulting in member-staining.

The image defect caused by the member-staining occurs remarkably in a high-speed machine. The reason for this is presumed to be related to the quantity of heat applied to a toner layer. As a speed of image formation increases, the heat from a fixing device is less likely to be transmitted to the toner, and a large amount of toner to be insufficiently melted tends to be increased. That is, a proportion of the toner in which the amount of releasing agent exuded from the inside of the toner is not sufficient is increased, and a fixing defect is more likely to occur.

In addition, in a case where a fixed image is formed using the toner containing a toner particle having a surface on which an iron oxide particle is present and the obtained fixed image is rubbed with an eraser, the toner of the fixed image may be easily peeled off from a paper. It is presumed that this is because the releasing agent does not have affinity around the iron oxide particle having a hydrophilic surface, a sliding property of the eraser deteriorates, and the toner of the fixed image is peeled off from the paper due to the rubbing between the eraser and the toner. In particular, in a recess of the paper between paper fibers, a pressure applied to the toner in the fixing step is not sufficient, only the surface of the toner is fixed in a molten state, and the releasing agent is not sufficiently fed from the inside of the toner. Therefore, the sliding property of the eraser remarkably deteriorates, and the toner is easily peeled off from the paper.

In the present invention, the iron oxide particle present on the surface of the toner particle is subjected to a hydrophobic treatment so as to contain a compound having a structure represented by Formula (1). That is, the iron oxide particle present on the surface of the toner particle is subjected to a hydrophobic treatment by bonding a siloxane condensate having a hydrocarbon group having one or more carbon atoms to the surface thereof. Therefore, in a case where the toner according to the present invention is used, the member-staining due to the fixing defect are suppressed and the rubbing fixability is improved.

According to the studies conducted by the present inventors, it is found that the iron oxide particle is subjected to a silane-based surface treatment, such that chargeability is improved and excellent characteristics of the toner are exhibited. In the present invention, a similar effect of improving chargeability can be obtained by subjecting the iron oxide particle to a surface treatment with a siloxane condensate.

On the other hand, in a case where an inorganic coupling agent condensate such as a titanate-based or aluminate-based coupling agent condensate other than Si is used, chargeability is inferior to that in a case where a siloxane condensate is used. Therefore, in a case where an iron oxide particle subjected to a surface treatment using an inorganic coupling agent condensate other than Si is present on the surface of the toner particle, charging of the toner is suppressed, and creeping discharge due to charging unevenness easily occurs. As a result, transferability cannot be compatible with fixability.

In addition, in a case where an iron oxide particle subjected to a surface treatment with an inorganic compound having no R group, hydrophobicity is not exhibited, and thus, the effect of improving a release performance cannot be obtained, and fixability is not improved.

In addition, in a case where the R group of Formula (1) is not a hydrocarbon group, hydrophobicity on the surface of the iron oxide particle cannot be obtained. Therefore, the effect of improving member-staining and rubbing fixability cannot be obtained.

Furthermore, in a case where silicone oil is used as the siloxane compound used for the hydrophobic treatment of the surface of the iron oxide particle, the effects of the present invention are not obtained. It is presumed that this is because a fixing ratio of the silicone oil to the iron oxide particle is low, the silicone oil is peeled off from the iron oxide particle in the fixing step, and a hydrophilic iron oxide surface is thus exposed.

The number of carbon atoms of the R group in Formula (1) is preferably 1 to 20, more preferably 2 to 10, and still more preferably 4 to 6.

The lower the number of carbon atoms of the R group in Formula (1), the lower the affinity between the surface of the iron oxide particle and the releasing agent. Therefore, the effect of attracting the releasing agent in the vicinity of the iron oxide particle is low, and the effect of suppressing the member-staining due to the fixing defect is also low.

On the other hand, as the number of carbon atoms of the R group in Formula (1) is increased, the affinity with the releasing agent is increased, and the effect of attracting the releasing agent in vicinity of the iron oxide particle is increased. However, when the number of carbon atoms is too large, the surface of the iron oxide particle cannot be uniformly hydrophobized due to steric hindrance of the R group. Therefore, a region that is not subjected to a hydrophobic treatment is generated on the surface of the iron oxide particle, and the hydrophilic surface is exposed. As a result, the effect of improving member-staining due to the fixing defect and rubbing fixability is reduced.

It is preferable that the iron oxide particle is externally added to the surface of the toner in a state of being sufficiently pulverized. In a case where the amount of secondary aggregate of the iron oxide particles coated on the surface of the toner particle is large, the releasing agent exuded in the fixing step is confined in the aggregated particle of the iron oxide particles, and the release effect around the iron oxide particle cannot be sufficiently obtained. The pulverized state of the iron oxide particle can be evaluated by measuring a diameter of the aggregated particle of the iron oxide particles on the surface of the toner with a scanning electron microscope. The diameter of the aggregated particle of the iron oxide particles is preferably 1.2 times or less the primary particle diameter of the iron oxide particle.

A fixing ratio of the iron oxide particle to the toner particle is preferably 50 to 80%. When the fixing ratio of the iron oxide particle is 80% or less, the iron oxide particle is not embedded in the surface of the toner, and it is difficult to suppress the exudation of the releasing agent. In addition, the effect of suppressing the creeping discharge on the surface of the toner in the transfer step can be sufficiently obtained, and the transfer defect can be efficiently suppressed. In addition, when the fixing ratio of the iron oxide particle is 50% or more, the iron oxide particle is less likely to be isolated, and thus, it is possible to suppress the loss of the effect of suppressing the transfer defect.

The fixing ratio of the iron oxide particle to the toner particle is more preferably 60 to 78%.

A content ratio of the iron oxide particle present on the surface of the toner particle with respect to a total amount of the toner is preferably 0.10 to 5.00 mass %. When the content ratio of the iron oxide particle present on the surface of the toner particle with respect to the total amount of the toner is 0.10 mass % or more, the creeping discharge along the surface of the toner layer is significantly suppressed, and transferability is dramatically improved, and thus, the transfer defect can be efficiently suppressed. In addition, since the releasing agent exuded in the fixing step can be attracted by the iron oxide particle subjected to the hydrophobic treatment, an excellent release performance can be obtained. In addition, when the content ratio of the iron oxide particle present on the surface of the toner particle with respect to the total amount of the toner is 5.00 mass % or less, the amount of iron oxide particle is not excessive, and occurrence of a white streak caused by wearing of the member by the isolated iron oxide particle can be suppressed. Therefore, it is possible to suppress a decrease in image density of the solid black image due to the occurrence of the white streak. The content ratio of the iron oxide particle present on the surface of the toner particle with respect to the total amount of the toner is more preferably 0.50 to 4.00 mass %, and still more preferably 1.00 to 2.50 mass %.

In the present invention, a difference between an SP value of the binder resin and an SP value of the releasing agent is preferably 1.50 or more, the SP value being calculated by a Fedors method. In addition, the difference between the SP value of the releasing agent and an SP value of the compound having a structure represented by Formula (1) is preferably 1.20 or less, the SP value being calculated by a Fedors method.

The SP value is also called a solubility parameter and is a numerical value used as an index of solubility or affinity indicating how much a substance dissolves in a certain substance. When a substance has an SP value closer to that of another substance, the substance has high solubility or affinity with the other substance, and when a substance has an SP value distant from that of another substance, the substance has low solubility or affinity with the other substance. In the present invention, the SP value is a value calculated based on a generally used Fedors method [Poly. Eng. Sci., 14(2) 147 (1974)]. A unit of the SP value is $(cal/cm^3)^{1/2}$.

In order for the toner heated and melted in the fixing step to exhibit the release effect, it is required for the releasing agent to be separated and exuded from the binder resin. In addition, the exuded releasing agent is required to uniformly spread around the iron oxide particle on the surface of the toner.

When the SP value of each of the binder resin, the releasing agent, and the compound having a structure represented by Formula (1) satisfies the above relationship, the releasing agent can be exuded from the inside of the toner at the time of fixing to create a state where the exuded releasing agent spreads around the iron oxide particle on the surface of the toner.

When the difference between the SP value of the binder resin and the SP value of the releasing agent is 1.50 or more, the releasing agent is easily separated from the binder resin and extrudes to the surface of the toner, thereby easily exhibiting the release effect.

In addition, when the difference between the SP value of the releasing agent and the SP value of the compound having a structure represented by Formula (1) is 1.20 or less, the releasing agent has high affinity with the compound having a structure represented by Formula (1) on the surface of the iron oxide particle. Therefore, it is possible to sufficiently solve the problem that the releasing agent exuded to the surface of the toner hardly exudes around the iron oxide particle that is not subjected to a hydrophobic treatment. Therefore, a high release effect can be obtained, and the image defect due to the member-staining can be suppressed.

The difference between the SP value of the binder resin and the SP value of the releasing agent is more preferably 2.00 to 3.50, and still more preferably 2.50 to 3.00. In addition, the difference between the SP value of the releasing agent and the SP value of the compound having a structure represented by Formula (1) is more preferably 1.10 or less, and still more preferably 1.00 or less.

In the present invention, in an endothermic curve obtained by a measurement using a differential scanning calorimeter (DSC) with both of a temperature increasing rate and a temperature decreasing rate of 100° C./min, a half-value width of an endothermic peak in the second temperature increasing process is preferably 4.0 to 8.0° C.

The endothermic peak in the present invention refers to an endothermic peak derived from the releasing agent.

As a general measurement method using DSC, for example, in the case of a method in accordance with JIS K 7121 (international standard is ASTM D3418-82), a temperature increasing rate is often measured as 10° C./min. Here, focusing on a printing speed of a printer, in order to prevent the toner from adhering to a fixing device, for example, it is required that the toner is melted and the releasing agent exudes in a very short time of several milliseconds to several tens of milliseconds so as to exhibit the release effect. Therefore, as a result of conducting studies focusing on the ability of the releasing agent to be separated from the binder resin and to exude, the present inventors found that it is effective to change the temperature increasing rate and the temperature decreasing rate in the measurement using DSC from the general 10 to 100° C./min.

When each of the measured temperature increasing rate and temperature decreasing rate is 10° C./min, the measured rate is considered to be slow in consideration of movement of the releasing agent. That is, in the parameter that can be obtained under the measurement conditions in which each of the measured temperature increasing rate and temperature decreasing rate is 10° C./min, the release performance in the fixing step of the printer assuming that several milliseconds to several tens of milliseconds are as the time during which the toner can directly receive heat from the fixing device cannot be described.

Next, a case where all the first temperature increase and temperature decrease and the second temperature increase are performed at 100° C./min will be described.

In a combination in which the releasing agent and the binder resin are likely to be compatible with each other, when the first temperature increase and cooling temperature decrease are performed at 100° C./min, there is no time for sufficiently separating the releasing agent from the binder resin, and the cooling is completed while the molten plastic state after the temperature increase is maintained. Then, when the temperature is increased again at 100° C./min in a state where the plastic state is maintained, the temperature is increased in a state where the binder resin and the releasing agent are partially plasticized, and an endothermic peak in a state where the binder resin and the releasing agent are mixed with each other is obtained instead of an endothermic peak unique to the releasing agent. In this case, as the releasing agent and the binder resin are easily compatible with each other, the half-value width is more broaden.

In the present invention, the half-value width of the endothermic peak in the second temperature increasing process is preferably 4.0 to 8.0° C., and means that the half-value width of the endothermic peak in the second temperature increasing process is sharp to some extent.

The sharpness of the endothermic peak reflects how sufficiently the melting of the releasing agent and the subsequent separation from the binder resin proceed in the temperature increasing process. That is, in a case where the releasing agent is melted and is further separated from the binder resin by sufficiently following the fast temperature increasing rate, the endothermic peak in the second temperature increasing process becomes sharp, and the half-value width becomes a small value.

In the present invention, in order to solve the member-staining in the fixing step described above, it is required that the toner is melted in a very short time of several milliseconds to several tens of milliseconds and the releasing agent exudes. Therefore, it is important to control the half-value width of the endothermic peak in the second temperature increasing process to a predetermined range.

In the present invention, when the half-value width of the endothermic peak in the second temperature increasing process is 4.0° C. or higher, phases of the binder resin and the releasing agent are separated in a development step and the releasing agent on the surface of the toner exudes, such that deterioration of developability can be suppressed. In addition, when the half-value width of the endothermic peak in the second temperature increasing process is 8.0° C. or lower, the melting of the releasing agent or the separation of the binder resin can sufficiently follow the high temperature increase, and the member-staining in the fixing step can be suppressed.

In the endothermic curve obtained by a measurement using DSC with both of the temperature increasing rate and the temperature decreasing rate of 100° C./min, the half-value width of the endothermic peak in the second temperature increasing process is more preferably 4.0 to 6.0° C.

In the present invention, wettability of the iron oxide particle present on the surface of the toner particle is preferably 40 to 80 vol %. The wettability of the iron oxide particle present on the surface of the toner particle is determined as follows. The iron oxide particle present on the surface of the toner particle is suspended in an amount of 0.1 g in 50 mL of a methanol/water mixed solvent, and a transmittance of light having a wavelength of 780 nm is measured. Then, a value of a methanol concentration when the transmittance is 50% is taken as the wettability of the iron oxide particle present on the surface of the toner particle. The wettability of the iron oxide particle present on the surface of the toner particle is more preferably 55 to 60 vol %. When the wettability is within the range of the above value, the chargeability of the iron oxide particle is increased, and the affinity with the releasing agent is improved. Therefore, a sufficient release effect around the iron oxide particle can be obtained and the image defect due to the member-staining can be suppressed. The wettability can be controlled by changing the surface treatment state of the iron oxide particle. When the wettability is 40 vol % or more, a high degree of the hydrophobic treatment of the surface of the iron oxide particle can be obtained, and a high release effect in the fixing step can be obtained. In addition, when the wettability is 80 vol % or less, the embedding of the iron oxide particle in the surface of the toner particle can be suppressed, and the problem such as the transfer defect or fogging due to a charge defect of the toner can be suppressed.

A water/methanol wettability test method will be described below.

In the present invention, the compound having a structure represented by Formula (1) having a surface on which an iron oxide particle is present is preferably a highly condensed compound having a high degree of condensation.

In a case where a high-molecular-weight body in a highly condensed state is present, a hydrophobic treatment agent tends to be bulky as compared with a case where a low-molecular-weight body in a low condensed state is present. Therefore, a density of hydrocarbon chains on the surface of the iron oxide particle is increased, and the affinity with the releasing agent exuded from the inside of the toner in the fixing step is easily improved. As a result, a remarkable effect on the member-staining due to a release defect or improvement of rubbing fixability can be obtained.

An index for evaluating the degree of condensation of the compound having a structure represented by Formula (1) contained in the surface of the iron oxide particle will be described below.

In the present invention, [Si—O—Si]/[Si—C] is preferably 1.4 to 1.7. Here, [ Si—O—Si]/[ Si—C] is defined as follows. An infrared absorption spectrum (Fourier-transform infrared (FT-IR) spectrum) of a component extracted from the iron oxide particle present on the surface of the toner particle with toluene is obtained. In the obtained FT-IR spectrum, a maximum absorption peak intensity in a range of 990 to 1,040 cm' is defined as [Si—O—Si]. In addition, a maximum absorption peak intensity in a range of 1,240 to 1,280 cm' is defined as [Si—C]. In this case, a ratio of [Si—O—Si] to [Si—C] is [ Si—O—Si]/[ Si—C].

In the iron oxide particle subjected to a hydrophobic treatment, a certain amount of a condensate of a treatment agent that is not bonded to the iron oxide particle is present. The iron oxide particle is immersed in 50 mL of toluene in an amount of 100 mg and then left for 5 hours, such that the condensate of the treatment agent can be extracted into the toluene. The condensed state of the hydrophobic treatment agent can be determined by measuring an FT-IR spectrum of the extract obtained by removing the iron oxide particle and then volatilizing and drying the toluene.

The FT-IR spectrum is measured by an attenuated total reflection (ATR) method. Measurement is performed under conditions in which Ge is used as an ATR crystal and an infrared light incident angle is 45° to obtain an FT-IR spectrum. In the obtained FT-IR spectrum, a maximum absorption peak intensity in a range of 990 to 1,040 $cm^{-1}$ considered to be derived from Si—O—Si of siloxane is defined as [Si—O—Si]. In addition, in the obtained FT-IR spectrum, a maximum absorption peak intensity in a range of 1,240 to 1,280 $cm^{-1}$ considered to be derived from Si—C of siloxane is defined as [ Si—C].

In a case where the FT-IR spectrum in a monomer unit obtained by hydrolyzing a silane coupling treatment agent is obtained, the peak intensity ratio [ Si—O—Si]/[Si—C] is 1.3.

On the other hand, in a case where the FT-IR spectrum in a multimer obtained by sufficiently condensing a hydrolyzate of a silane coupling treatment agent is obtained, the peak intensity ratio [Si—O—Si]/[Si—C] is 1.7.

When a condensation rate of the silane coupling agent in the toluene extract of the iron oxide particle is low, since a proportion of the monomer unit in the extract is high, the peak intensity ratio [Si—O—Si]/[Si—C] is a value close to 1.3. On the other hand, when the condensation rate of the silane coupling agent in the toluene extract of the iron oxide particle is high, since the proportion of the monomer unit in the extract is low, the peak intensity ratio [Si—O—Si]/[Si—C] is a value close to 1.7.

When [Si—O—Si]/[Si—C] is 1.4 or more, the condensation rate of the silane coupling agent can be high, and the release effect in the fixing step can be improved.

The measurement of the FT-IR spectrum by the ATR method will be described below.

In addition, in the iron oxide particle present on the surface of the toner particle, when a near edge X-ray absorption fine structure (hereinafter, referred to as NEXAFS) is observed by a measurement by a total electron yield (TEY) method using soft X-rays, an obtained absorption spectrum of Si has a peak A in a range of 1,844.4 to 1,844.8 eV and a peak B in a range of 1,846.1 to 1,846.6 eV, and IA/(IA+IB)/MSi is preferably 40 to 55 g/mol, the IA being an area of the peak A, the D3 being an area of the peak B, and the MSi being the number of moles of Si derived from a silane compound contained in 1 g of the iron oxide particle.

By observing NEXAFS, information on a bonding state of the Si elements of the silane compound bonded to the surface of the iron oxide particle can be obtained. NEXAFS is observed by the total electron yield (TEY) method in which the energy of electrons generated from a sample is not selected in a spectroscopic analysis method using soft X-rays.

The soft X-rays penetrate to a depth of about 50 nm from the surface of the sample to be measured, but electrons to be detected by NEXAFS, such as photoelectrons or Auger electrons coming out from the surface of the sample are limited up to a depth of about 5 nm. Therefore, a chemical bonding state of the silane compound on the surface of the iron oxide particle can be significantly intensively observed.

Figure 2:
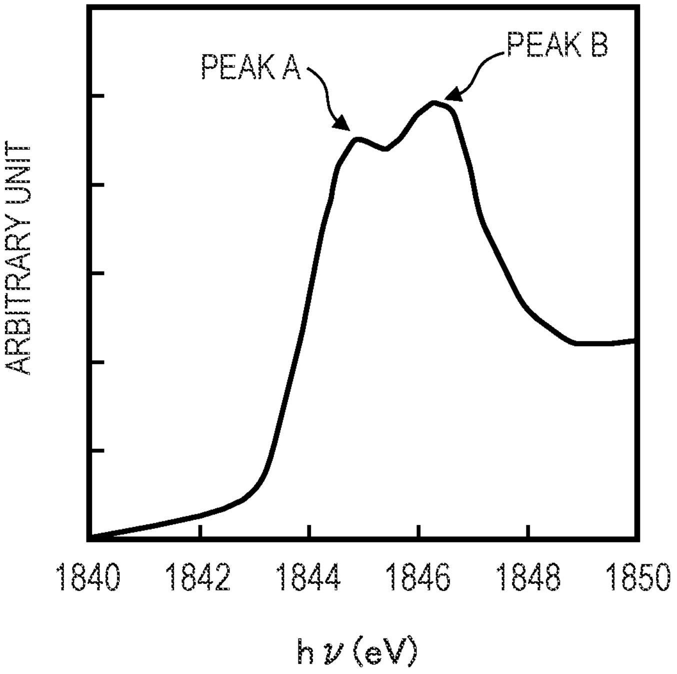
FIG. 2 illustrates an example of an absorption spectrum of Si in a near edge X-ray absorption fine structure (NEXAFS) obtained by observing an iron oxide particle subjected to a hydrophobic treatment.

FIG. 2 illustrates an example of the absorption spectrum of Si in NEXAFS obtained by measuring the iron oxide particle subjected to the hydrophobic treatment. The absorption spectrum of Si has two peaks A and B in a range of 1,840 to 1,850 eV. The peak A appears on the low energy side and the peak B appears on the high energy side. Specifically, a peak position of the peak A appears in a range of 1,844.4 to 1,844.8 eV and a peak position of the peak B appears in a range of 1,846.1 to 1,846.6 eV.

Here, it is known that when a bond between an Si atom and an O atom contained in the silane compound is represented by Si—O—X, the bond between the Si atom and the O atom when X is Si corresponds to the peak A, and the bond between the Si atom and the O atom when X is Fe corresponds to the peak B. That is, it can be determined that the amount of silane compound bonded to the surface of the iron oxide particle is small as the peak A in the absorption spectrum of Si is large, and the amount of silane compound bonded to the surface of the iron oxide particle is large as the peak B is large.

As the proportion of the silane compound chemically bonded to the surface of the iron oxide particle is small, the silane coupling agents are highly condensed with each other, and the silane compound on the surface of the iron oxide particle becomes bulky. As the silane compound on the surface of the iron oxide particle becomes bulky, the affinity with the releasing agent is high, and the release effect around the iron oxide particle is further improved.

That is, the absorption spectrum of Si in NEXAFS described above is measured, such that information on a bond proportion between the iron oxide particle and the silane coupling agent can be obtained. Therefore, the bulkiness of the silane compound on the surface of the iron oxide particle can be evaluated.

When IA/(IA+IB)/MSi is 55 g/mol or less, the bond between the silane compound and the iron oxide particle is strong, and exposure on the hydrophilic iron oxide surface is suppressed. When IA/(IA+IB)/MSi is 40 g/mol or more, the degree of condensation of the silane compound can be high, and a high release effect can be obtained. IA/(IA+IB)/MSi is more preferably 43 to 48 g/mol.

The reason for dividing the value of IA/(IA+IB) by the value of MSi is for standardization. MSi is measured using, for example, a scanning X-ray fluorescence spectrometer ZSX PrimusII (manufactured by Rigaku Corporation).

The toner according to the present invention contains the iron oxide particle present on the surface of the toner particle, the iron oxide particle being subjected to a hydrophobic treatment so as to contain a compound having a structure represented by Formula (1). Here, the iron oxide particle can be contained on the surface of the toner particle by being externally added to the toner particle.

Examples of the iron oxide particle include an iron oxide such as magnetite, maghemite, or ferrite; and a metal such as cobalt or nickel or an alloy of these metals and a metal such as aluminum, copper, magnesium, tin, zinc, beryllium, calcium, manganese, selenium, titanium, tungsten, or vanadium, and a mixture thereof.

The shape of the iron oxide particle is an octahedron, a hexahedron, a spherical shape, a needle shape, a scaly shape, or the like, and any shape can be used, but the shape of the iron oxide particle has preferably a polyhedral structure such as at least a tetrahedron, and more preferably a polyhedral structure such as at least an octahedron.

A number average particle diameter (D1) of the primary particles of the iron oxide particles is preferably 0.50 μm or less, and more preferably 0.05 to 0.30 μm.

When the number average particle diameter (D1) of the primary particles of the iron oxide particles is 0.05 to 0.30 μm, the iron oxide particle is likely to uniformly adhere to the surface of the toner particle in a state of the primary particle in the external addition step, and the effect of reducing fogging is obtained. The number average particle diameter (D1) of the primary particles of the iron oxide particles is more preferably 0.10 to 0.30 μm.

In addition, as the magnetic characteristics of the iron oxide particle at the time of application of 79.6 kA/m, when a coercive force (Hc) is 1.6 to 25.0 kA/m, developability tends to be improved, which is preferable. The coercive force (Hc) is more preferably 15.0 to 25.0 kA/m. In addition, a strength of magnetization (σs) is preferably 30 to 90 $Am^2/kg$, and more preferably 40 to 80 $Am^2/kg$. In addition, a residual magnetization (σr) is preferably 1.0 to 10.0 $Am^2/kg$, and more preferably 1.5 to 8.0 $Am^2/kg$.

The iron oxide particle can be produced by, for example, the following method.

Alkali such as sodium hydroxide is added to an aqueous ferrous salt solution in an equivalent amount or an equivalent amount or more with respect to an iron compound, thereby preparing an aqueous solution containing ferrous hydroxide. Air is blown into the prepared aqueous solution while a pH of the prepared aqueous solution is maintained at a pH of 7 or higher, and an oxidation reaction of the ferrous hydroxide is performed while the aqueous solution is heated to 70° C. or higher, such that seed crystals to be a core of an iron oxide powder are first generated.

Next, an aqueous solution containing about 1 equivalent of ferrous sulfate is added to a slurry-like solution containing the seed crystals based on the amount of alkali added in advance. The reaction of the ferrous hydroxide proceeds while maintaining a pH of the solution at 5 to 10 and blowing the air, thereby growing an iron oxide powder using the seed crystals as a core. At this time, it is possible to control the shape and magnetic characteristics of the iron oxide particle by selecting an arbitrary pH, reaction temperature, and stirring conditions. As the oxidation reaction proceeds, the pH of the solution shifts to the acidic side, and it is preferable that the pH of the solution is not less than 5. An iron oxide particle can be obtained by filtering, washing, and drying the iron oxide particle obtained as described above by a general method.

In addition, in a case where the surface treatment is performed by a dry method, the washed, filtered, and dried iron oxide particle is subjected to a coupling agent treatment. When the surface treatment is performed by a wet method, the dried iron oxide particle is re-dispersed after the oxidation reaction, or the iron oxide particle obtained by being washed and filtered is re-dispersed in another aqueous medium after the oxidation reaction without being dried, and then, the coupling agent treatment is performed. In the present invention, both the dry method and the wet method can be appropriately selected.

An example of the coupling agent that can be used in the surface treatment of the iron oxide particle includes a silane coupling agent. A silane coupling agent having a structure represented by General Formula (2) is more preferably used.

$$R\text{—}SiX_nY_m \qquad (2)$$

Wherein, each of X and Y represents an alkoxy group, n and m each independently represent an integer of 0 to 3, n+m is 3, and R represents an alkyl group, a phenyl group, a vinyl group, an epoxy group, or a (meth)acrylic group.

Examples of the silane coupling agent represented by General Formula (2) include vinyltrimethoxysilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-glycidoxypropylmethyldiethoxysilane, γ-aminopropyltriethoxysilane, N-phenyl-γ-aminopropyltrimethoxysilane, γ-methacryloxypropyltrimethoxysilane, vinyltriacetoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, n-propyltrimethoxysilane, isopropyltrimethoxysilane, n-butyltrimethoxysilane, isobutyltrimethoxysilane, trimethylmethoxysilane, n-hexyltrimethoxysilane, n-octyltrimethoxysilane, n-octyltriethoxysilane, n-decyltrimethoxysilane, hydroxypropyltrimethoxysilane, n-hexadecyltrimethoxysilane, and n-octadecyltrimethoxysilane.

In the present invention, a silane coupling agent represented by General Formula (2) in which R is an alkyl group can be preferably used. Among them, R is preferably an alkyl group having 3 to 6 carbon atoms, and R is particularly preferably an alkyl group having 3 or 4 carbon atoms.

In a case where the silane coupling agent is used, the silane coupling agent can be used for treatment alone or a plurality of silane coupling agents can be used in combination for treatment. When a plurality of silane coupling agents is used in combination, each of the silane coupling agents may be used for treatment or all of the silane coupling agents may be simultaneously used for treatment.

A total amount of the coupling agent used for treatment is preferably 0.9 to 3.0 parts by mass with respect to 100 parts by mass of the iron oxide particle, and it is important to adjust the amount of treatment agent depending on a surface area of the iron oxide particle, the reactivity of the coupling agent, and the like.

In the present invention, examples of the binder resin of the toner include, but are not limited to, a vinyl-based resin and a polyester-based resin, and a resin known in the related art can be used.

Specifically, a styrene-based copolymer such as polystyrene, a styrene-propylene copolymer, a styrene-vinyltoluene copolymer, a styrene-methyl acrylate copolymer, a styrene-ethyl acrylate copolymer, a styrene-butyl acrylate copolymer, a styrene-octyl acrylate copolymer, a styrene-methyl methacrylate copolymer, a styrene-ethyl methacrylate copolymer, a styrene-butyl methacrylate copolymer, a styrene-octyl methacrylate copolymer, a styrene-butadiene copolymer, a styrene-isoprene copolymer, a styrene-maleic acid copolymer, or a styrene-maleic acid ester copolymer, polyacrylic acid ester, polymethacrylic acid ester, and polyvinyl acetate can be used, and these resins can be used alone or in combination of two or more thereof. Among them, a styrene-based copolymer and a polyester resin are particularly preferred in terms of development characteristics, fixability, and the like.

A glass transition temperature (Tg) of the toner is preferably 40 to 70° C. When the glass transition temperature of the toner is 40 to 70° C., storage stability and durability can be improved while excellent fixability is maintained.

A charge control agent is preferably added to the toner according to the present invention. As a negative charge control agent, an organometallic complex compound and a chelate compound are effective, and specific examples thereof include a monoazo metal complex compound; an acetylacetone metal complex compound; and a metal complex compound such as aromatic hydroxycarboxylic acid or aromatic dicarboxylic acid. Specific examples of commercially available products of the negative charge control agent include Spilon Black TRH, T-77, and T-95 (manufactured by Hodogaya Chemical Co., Ltd.) and BONTRON (registered trademark) S-34, S-44, S-54, E-84, E-88, and E-89 (manufactured by Orient Chemical Industries Co., Ltd.).

In addition, examples of a positive charge control agent include nigrosine and a nigrosine-modified product with a fatty acid metal salt; a quaternary ammonium salt such as tributylbenzylammonium-1-hydroxy-4-naphthosulfonate or tetrabutylammonium tetrafluoroborate, and an onium salt such as a phosphonium salt which is an analogue thereof, and a lake pigment thereof; a triphenylmethane dye and a lake pigment thereof (as a laking agent, for example, phosphotungstic acid, phosphomolybdic acid, phosphotungstomolybdic acid, tannic acid, lauric acid, gallic acid, ferricyanic acid, a ferrocyanide compound, or the like); a metal salt of a higher fatty acid; diorganotin oxide such as dibutyltin oxide, dioctyltin oxide, or dicyclohexyltin oxide; and organotin borate such as dibutyltin borate, dioctyltin borate, or dicyclohexyltin borate. Specific examples of commercially available products of the positive charge control agent include TP-302 and TP-415 (manufactured by Hodogaya Chemical Co., Ltd.), BONTRON (registered trademark) N-01, N-04, N-07, and P-51 (manufactured by Orient Chemical Industries Co., Ltd.), and Copy Blue PR (manufactured by Clariant AG).

These charge control agents can be used alone or in combination of two or more thereof. A use amount of charge control agent is preferably 0.1 to 10.0 parts by mass, and more preferably 0.1 to 5.0 parts by mass, with respect to 100 parts by mass of the binder resin, from the viewpoint of the charge amount of the toner.

The toner particle contains a releasing agent. The toner particle contains a releasing agent, such that fixability is improved.

As the releasing agent, all known releasing agents can be used. Specific examples thereof include petroleum wax such as paraffin wax, microcrystalline wax, or petrolactam and a derivative thereof, montan wax and a derivative thereof, hydrocarbon wax obtained by a Fischer-Tropsch method and a derivative thereof, polyolefin wax typified by polyethylene or polypropylene and a derivative thereof, natural wax such as carnauba wax or candelilla wax and a derivative thereof, and ester wax. Here, the derivative includes an oxide, a block copolymer with a vinyl-based monomer, or a graft-modified product. In addition, as the ester wax, monofunctional ester wax, bifunctional ester wax, or polyfunctional wax such as tetrafunctional or hexafunctional ester wax can be used.

A content ratio of the releasing agent in the toner particle is preferably 0.5 to 10 parts by mass with respect to 100 parts by mass of the binder resin. When the content ratio of the releasing agent is within the above range, fixability is improved and storage stability of the toner is not impaired.

In addition, the releasing agent can be blended in the binder resin by a method in which, in production of a binder resin, a resin is dissolved in a solvent, a temperature of the resin solution is increased, and addition and mixing are performed while stirring is performed, or a method in which addition is performed during melt-kneading in production of a toner.

A peak temperature (hereinafter, referred to as a melting point) of the highest endothermic peak measured with a differential scanning calorimeter (DSC) of the releasing agent is preferably 60 to 140° C., and more preferably 70 to 130° C. When the peak temperature (melting point) of the highest endothermic peak is 60 to 140° C., the toner is easily plasticized at the time of fixing, and fixability is improved. In addition, leakage of the releasing agent and the like hardly occur when the toner is stored for a long period of time, which is preferable.

The peak temperature of the highest endothermic peak of the releasing agent can be measured in accordance with ASTM D3418-82 using a differential scanning calorimeter "Q 1000" (manufactured by TA Instruments). In this case, a melting point of each of indium and zinc is used for correction of a temperature of a detection unit of an apparatus, and heat of fusion of indium is used for correction of the quantity of heat.

Specifically, about 10 mg of a measurement sample is precisely weighed, the measurement sample is placed in an aluminum pan, and measurement is performed at a measurement temperature of 30 to 200° C. and a temperature increasing rate of 10° C./min using an empty aluminum pan as a reference. In the measurement, the temperature is once increased to 200° C., subsequently, the temperature is decreased to 30° C. at 10° C./min, and then, the temperature is increased again at 10° C./min. The peak temperature of the highest endothermic peak of the releasing agent is determined from the DSC curve at a temperature of 30 to 200° C. in the second temperature increasing process.

Examples of the colorant contained in the toner particle include, but are not particularly limited to, an organic pigment, an organic dye, and an inorganic pigment, and a colorant known in the related art can be used.

Examples of a cyan colorant include a copper phthalocyanine compound and a derivative thereof, an anthraquinone compound, and a basic dye lake compound. Specifically, examples of the cyan colorant include the following: C.I. Pigment Blue 1, C.I. Pigment Blue 7, C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 60, C.I. Pigment Blue 62, and C.I. Pigment Blue 66.

Examples of a magenta colorant include the following: a condensed azo compound, a diketopyrrolopyrrole compound, an anthraquinone compound, a quinacridone compound, a basic dye lake compound, a naphthol compound, a benzimidazolone compound, a thioindigo compound, and a perylene compound. Specifically, examples of the magenta colorant include the following: C.I. Pigment Red 2, C.I. Pigment Red 3, C.I. Pigment Red 5, C.I. Pigment Red 6, C.I. Pigment Red 7, C.I. Pigment Violet 19, C.I. Pigment Red 23, C.I. Pigment Red 48:2, C.I. Pigment Red 48:3, C.I. Pigment Red 48:4, C.I. Pigment Red 57:1, C.I. Pigment Red 81:1, C.I. Pigment Red 122, C.I. Pigment Red 144, C.I. Pigment Red 146, C.I. Pigment Red 150, C.I. Pigment Red 166, C.I. Pigment Red 169, C.I. Pigment Red 177, C.I. Pigment Red 184, C.I. Pigment Red 185, C.I. Pigment Red 202, C.I. Pigment Red 206, C.I. Pigment Red 220, C.I. Pigment Red 221, and C.I. Pigment Red 254.

Examples of a yellow colorant include a condensed azo compound, an isoindolinone compound, an anthraquinone compound, an azo metal complex, a methine compound, and an allylamide compound. Specifically, examples of the yellow colorant include the following: C.I. Pigment Yellow 12, C.I. Pigment Yellow 13, C.I. Pigment Yellow 14, C.I. Pigment Yellow 15, C.I. Pigment Yellow 17, C.I. Pigment Yellow 62, C.I. Pigment Yellow 74, C.I. Pigment Yellow 83, C.I. Pigment Yellow 93, C.I. Pigment Yellow 94, C.I. Pigment Yellow 95, C.I. Pigment Yellow 97, C.I. Pigment Yellow 109, C.I. Pigment Yellow 110, C.I. Pigment Yellow 111, C.I. Pigment Yellow 120, C.I. Pigment Yellow 127, C.I. Pigment Yellow 128, C.I. Pigment Yellow 129, C.I. Pigment Yellow 147, C.I. Pigment Yellow 151, C.I. Pigment Yellow 154, C.I. Pigment Yellow 155, C.I. Pigment Yellow 168, C.I. Pigment Yellow 174, C.I. Pigment Yellow 175, C.I. Pigment Yellow 176, C.I. Pigment Yellow 180, C.I. Pigment Yellow 181, C.I. Pigment Yellow 185, C.I. Pigment Yellow 191, and C.I. Pigment Yellow 194.

Examples of a black colorant include carbon black and a colorant provided by color mixing using the yellow colorant, the magenta colorant, and the cyan colorant described above to give a black color.

These colorants may be used alone or as a mixture or used in a solid solution state. The colorant is selected from the viewpoint of hue angle, chroma, brightness, lightfastness, OHP transparency, and dispersibility in the toner particle.

In a case where a magnetic body is used as the colorant, the magnetic body contains magnetic iron oxide such as triiron tetroxide or γ-iron oxide as a main component, and may contain an element such as phosphorus, cobalt, nickel, copper, magnesium, manganese, aluminum, or silicon. A BET specific surface area of the magnetic body is preferably 2 to 30 $m^2/g$, and more preferably 3 to 28 $m^2/g$, the BET specific surface area being obtained by a nitrogen adsorption method. In addition, a Mohs hardness of the magnetic body is preferably 5 to 7. The shape of the magnetic body is a polyhedron, an octahedron, a hexahedron, a spherical shape, a needle shape, a scaly shape, or the like, and a low-anisotropy magnetic body having a shape such as a polyhedron, an octahedron, a hexahedron, or a spherical shape is preferred in terms of increasing an image density.

A content ratio of the colorant in the toner particle is preferably 1 to 20 parts by mass with respect to 100 parts by mass of the binder resin or a polymerizable monomer constituting the binder resin. In a case where a magnetic powder is used as the colorant, a content ratio of the magnetic powder in the toner particle is preferably 20 to 200 parts by mass, and more preferably 40 to 150 parts by mass, with respect to 100 parts by mass of the binder resin or the polymerizable monomer constituting the binder resin.

An iron oxide particle may be added to the toner according to the present invention, if necessary, and an external additive may be attached to the surface of the toner through mixing.

Examples of the external additive include metal oxide fine particles (inorganic fine particles) such as a silica fine particle, an alumina fine particle, a titania fine particle, a zinc oxide fine particle, a strontium titanate fine particle, a cerium oxide fine particle, and a calcium carbonate fine particle. In addition, a composite oxide fine particle using two or more metals may be used, and two or more selected from these fine particle groups may be used in an arbitrary combination.

In addition, a resin fine particle or an organic-inorganic composite fine particle of a resin fine particle and an inorganic fine particle may be used as the external additive.

It is more preferable that the external additive includes at least one selected from the group consisting of a silica fine particle and an organic-inorganic composite fine particle.

Examples of the silica fine particle include a sol-gel silica fine particle produced by a sol-gel method, an aqueous colloidal silica fine particle, an alcohol-silica fine particle, a fumed silica fine particle obtained by a gas phase method, and a fused silica fine particle.

Examples of the resin fine particle include resin particles such as a vinyl-based resin, a polyester resin, and a silicone resin.

An example of the organic-inorganic composite fine particle includes an organic-inorganic composite fine particle composed of a resin fine particle and an inorganic fine particle.

In the case of the organic-inorganic composite fine particle, excellent durability and chargeability exhibited by the inorganic fine particle are maintained, and it is difficult to inhibit coalescence of the toner particles and to cause fixing inhibition due to components of a resin material having a low thermal capacity during fixing. Therefore, it is easy to achieve both durability and fixability.

Preferably, the organic-inorganic composite fine particle is a composite fine particle having a convex composed of an inorganic fine particle embedded in a surface of a resin fine particle (preferably, a vinyl-based resin fine particle) as a resin component. More preferably, the organic-inorganic composite fine particle is a composite fine particle having a structure in which an inorganic fine particle is exposed to a surface of a vinyl-based resin fine particle. Still more preferably, the organic-inorganic composite fine particle is a composite fine particle having a structure in which a surface of a vinyl-based resin fine particle has a convex derived from an inorganic fine particle.

Examples of the inorganic fine particle constituting the organic-inorganic composite fine particle include fine particles such as a silica fine particle, an alumina fine particle, a titania fine particle, a zinc oxide fine particle, a strontium titanate fine particle, a cerium oxide fine particle, and a calcium carbonate fine particle.

A content ratio of the external additive in the toner is preferably 0.1 to 20.0 parts by mass with respect to 100 parts by mass of the toner particle.

The external additive may be subjected to a hydrophobic treatment with a hydrophobic treatment agent.

Examples of the hydrophobic treatment agent include chlorosilanes such as methyltrichlorosilane, dimethyldichlorosilane, trimethylchlorosilane, phenyltrichlorosilane, diphenyldichlorosilane, t-butyldimethylchlorosilane, and vinyltrichlorosilane;

alkoxysilanes such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxy silane, γ-aminopropyltriethoxysilane, γ-(2-aminoethyl)aminopropyltrimethoxysilane, and γ-(2-aminoethyl) aminopropylmethyldimethoxysilane;

silazanes such as hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, and dimethyltetravinyldisilazane;

silicone oils such as dimethylsilicone oil, methylhydrogensilicone oil, methylphenylsilicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oil, and terminal-reactive silicone oil;

siloxanes such as hexamethylcyclotrisiloxane, octamethylcyclotetrasiloxane, decamethylcyclopentasiloxane, hexamethyldisiloxane, and octamethyltrisiloxane; and fatty acids and metal salts thereof, for example, long-chain fatty acids such as undecylic acid, lauric acid, tridecylic acid, dodecylic acid, myristic acid, palmitic acid, pentadecylic acid, stearic acid, heptadecylic acid, arachidic acid, montanic acid, oleic acid, linoleic acid, and arachidonic acid, and salts of these fatty acids with a metal such as zinc, iron, magnesium, aluminum, calcium, sodium, or potassium.

Among them, alkoxysilanes, silazanes, and silicone oils are preferably used in terms of easiness of the hydrophobic treatment. These hydrophobic treatment agents may be used alone or in a combination of two or more thereof.

The toner may contain a plurality of external additives in order to improve flowability or chargeability of the toner.

The number average particle diameter of the primary particles of the external additive is preferably 0.030 to and 0.30 μm.

In the toner according to the present invention, another external additive such as a lubricating powder such as a fluororesin powder, a zinc stearate powder, or a polyvinylidene fluoride powder; an abrasive such as a cerium oxide powder, a silicon carbide powder, or a strontium titanate powder; a flowability-imparting agent such as a titanium oxide power or an aluminum oxide powder; an anti-caking agent; and a reverse polarity organic fine particle or inorganic fine particle can be further used in a small amount as a developability improver as long as it does not have a substantial adverse effect. Furthermore, a surface of the external additive can be subjected to a hydrophobic treatment.

A weight average particle diameter (D4) of the toner particles is preferably 3.0 to 12.0 μm, and more preferably 4.0 to 10.0 μm. When the weight average particle diameter (D4) of the toner particles is 3.0 to 12.0 μm, excellent flowability can be obtained and development can be sufficiently performed on a latent image.

A method of producing a toner is not particularly limited, and a known production method can be adopted. Examples of the method of producing a toner include a pulverization method, a polymerization method, a dispersion polymerization method, an association aggregation method, a dissolution suspension method, a suspension polymerization method, and an emulsion aggregation method.

Hereinafter, a pulverization method for producing a toner through a melt-kneading step and a pulverization step will be specifically described, and the present invention is not limited thereto.

For example, a binder resin, a colorant, a releasing agent, and if necessary, a charge control agent and an external additive are sufficiently mixed with each other by a mixer such as a Henschel mixer or a ball mill (mixing step). The obtained mixture is melt-kneaded using a heating kneader such as a twin-screw kneading extruder, a heating roll, a kneader, or an extruder (melt-kneading step).

The obtained melt-kneaded product is subjected to cooling and solidification, pulverization is performed using a pulverizer (pulverization step), and then classification is performed using a classifier (classification step), thereby obtaining a toner particle. Furthermore, if necessary, the toner particle and an external additive are mixed with each other by a mixer such as a Henschel mixer to obtain a toner.

Examples of the mixer include the following: FM Mixer (manufactured by NIPPON COKE & ENGINEERING CO., LTD.); Super Mixer (manufactured by KAWATA MFG. CO., LTD.); Ribocone (manufactured by OKAWARA MFG. CO., LTD.); Nauta Mixer, Turbulizer, and Cyclomix (manufactured by Hosokawa Micron Corporation); Spiral Pin Mixer (manufactured by Pacific Machinery & Engineering Co., Ltd.); and Lodige Mixer (manufactured by Matsubo Corporation).

Examples of the heating kneader include the following: KRC Kneader (manufactured by Kurimoto, Ltd.); Buss Co-Kneader (manufactured by Buss Co., Ltd.), TEM-type Extruder (manufactured by TOSHIBA MACHINE MACHINERY CO., LTD.); TEX Twin-Screw Kneader (manufactured by The Japan Steel Works, Ltd.); PCM Kneader (manufactured by Ikegai Corp.); three-roll mill, mixing roll mill, and kneader (manufactured by INOUE MFG., INC.); Kneadex (manufactured by Mitsui Mining & Smelting Co., Ltd.); MS-type pressure kneader and Kneader-Ruder (manufactured by Moriyama Manufacturing Co., Ltd.); and Banbury mixer (manufactured by Kobe Steel, Ltd.).

Examples of the pulverizer include the following: Counter Jet Mill, Micron Jet, and Inomizer (manufactured by Hosokawa Micron Corporation); IDS-type Mill and PJM Jet Mill (manufactured by Nippon Pneumatic Mfg. Co., Ltd.); Cross Jet Mill (manufactured by Kurimoto, Ltd.); Ulmax (manufactured by Nisso Engineering Co., Ltd.); SK Jet 0-Mill (manufactured by Seishin Enterprise Co., Ltd.); Criptron (manufactured by Kawasaki Heavy Industries, Ltd.); Turbo Mill (manufactured by Turbo Kogyo Co., Ltd.); and Super Rotor (manufactured by Nisshin Engineering Inc.).

Examples of the classifier include the following: Classiel, Micron Classifier, and Spedic Classifier (manufactured by Seishin Enterprise Co., Ltd.); Turbo Classifier (manufactured by Nisshin Engineering Inc.); Micron Separator, Turboplex (ATP), and TSP Separator (manufactured by Hosokawa Micron Corporation); Elbow Jet (manufactured by Nittetsu Mining Co., Ltd.); Dispersion Separator (manufactured by Nippon Pneumatic Mfg. Co., Ltd.); and YM Microcut (manufactured by Yasukawa Shoji Co., Ltd.).

In addition, examples of a sieving device for sieving coarse particles include the following: Ultra Sonic (manufactured by Kouei-Sangyou Co., Ltd.); Rezona Sieve and Gyro Sifter (manufactured by Tokuju Corporation); Vibrasonic System (manufactured by Dalton Corporation); Sonicreen (manufactured by SINTOKOGIO, LTD.); Turbo Screener (manufactured by Turbo Kogyo Co., Ltd.); Microsifter (manufactured by Makino mfg. co., Ltd.); and circular vibrating sieves.

The mixing time in the external addition step is preferably adjusted to 0.5 to 10.0 minutes, and more preferably 1.0 to 5.0 minutes, from the viewpoint of dispersibility of the external additive.

Next, a method of measuring each of physical properties will be described.

<Method of Measuring Number Average Particle Diameter (D1) of Primary Particles of Iron Oxide Particles>

First, the iron oxide particle is observed with a transmission electron microscope. For the observation, for example, a transmission electron microscope JEM2800 (manufactured by JEOL, Ltd.) can be used to calculate a particle diameter from the captured bright field image. The image capturing conditions of JEM2800 are as follows.

The iron oxide particle to be observed is sufficiently dispersed in an epoxy resin, and then curing is performed in an atmosphere at a temperature of 40° C. for 2 days, thereby obtaining a cured product. The obtained cured product is used as a flaky sample by an ultramicrotome (manufactured by Leica Microsystems GmbH).

A transmission image is acquired under conditions of an acceleration voltage of 200 kV, a magnification of 100,000 times, and a size of 1,024×1,024 pixels using JEM2800.

The obtained transmission image is subjected to binarization using an image analyzing software "Image-Pro Plus ver. 5.0" to measure major diameters of 100 iron oxide particles, and an arithmetic average value is used as a number average particle diameter of primary particles.

<Method of Measuring Number Average Aggregated Particle Diameter of Iron Oxide Particles on Surface of Toner>

The surface of the toner is observed with a scanning electron microscope to measure a number average aggregated particle diameter of the iron oxide particles. Therefore, a pulverized state of the iron oxide particle externally added to the surface of the toner can be observed.

For the observation, a particle diameter is calculated from the captured reflected electron image using a scanning electron microscope S-4800 (manufactured by Hitachi High-Tech Corporation). The image capturing conditions of S-4800 are as follows.

(1) S-4800 Observation Conditions

First, the observation conditions of S-4800 are set as follows: acceleration voltage: 1.0 kV, emission current: 20 μA, probe current: Normal, focus mode: UHR, and WD: 3.0 mm.

A detector (U+BSE mode) and L.A.100 are selected, and a reflected electron image is observed in a field of view magnified up to 200,000 times.

Automatic brightness adjustment is performed and an image having a size of 1,280×960 pixels is stored. A plurality of images are captured to obtain an image in which at least 100 iron oxide aggregated particles can be analyzed.

(2) Image Analysis

The transmission image is subjected to binarization using an image analyzing software "Image-Pro Plus ver. 5.0" to measure major diameters of 100 iron oxide particles (aggregated particles), and an arithmetic average value is used as a number average aggregated particle diameter of the iron oxide particles.

<Method of Quantifying Iron Oxide Particle Present on Surface of Toner Particle>

An external additive component including an iron oxide particle is separated from the toner particle, and the iron oxide particle is further isolated and recovered from the separated external additive component, such that the iron oxide particle present on the surface of the toner particle can be quantified. Examples of a specific method thereof include the following methods.

(1) A toner is placed in a sample bottle in an amount of 5 g, and 200 mL of methanol is added thereto. Further, several drops of "Contaminon N" (a 10 mass % aqueous solution of a neutral detergent for washing a precise measuring apparatus containing a nonionic surfactant, an anionic surfactant, and an organic builder and having a pH of 7, manufactured by Wako Pure Chemical Industries, Ltd.) are added.

(2) The sample is dispersed with an ultrasonic cleaner for 5 minutes to separate the external additive component.

(3) The toner particle and the external additive are separated by suction filtration (10 μm membrane filter).

(4) The above steps (2) and (3) are performed three times in total.

By the above operation, the external additive component is separated from the toner particle. The iron oxide particle is isolated and recovered by centrifugation of the recovered solution with a centrifuge. Next, the solvent is removed and the resultant particle is sufficiently dried by a vacuum drier to measure a mass of the resultant particle, thereby determining a content of the iron oxide particle in 5 g of the toner. Therefore, a content ratio of the iron oxide particle present on the surface of the toner particle in the toner can be determined.

<Method of Measuring Fixing Ratio of Iron Oxide Particle>

To a 50 mL vial, 20 g of "Contaminon N" (a 10 mass % aqueous solution of a neutral detergent for washing a precise measuring apparatus containing a nonionic surfactant, an anionic surfactant, and an organic builder and having a pH of 7) is weighed and mixed with 1 g of the toner.

The vial is set in "KM Shaker" (model: V.SX, manufactured by IWAKI SANGYO CO., LTD.), a speed is set to 50, and shaking is performed for 30 seconds. Therefore, an unfixed iron oxide particle is transferred from the surface of the toner particle to a dispersion liquid.

Thereafter, the toner particle and the iron oxide particle transferred to the supernatant are separated by a centrifuge (trade name: H-9R, manufactured by Kokusan Co., Ltd.) at 16.67 $s^{-1}$ for 5 minutes. The separated toner is vacuum-dried (40° C./24 hours) to be dried and solidified, thereby obtaining a sample.

The toner is pelletized by the following press mold to be used as a sample. In the sample of the toner before and after the above treatment, a unique Fe element of the iron oxide particle to be analyzed is quantified by the following wavelength dispersive X-ray fluorescence (XRF) analysis. Then, the amount of iron oxide particle remaining on the surface of the toner particle without transferred to the supernatant by the above treatment is determined by the following Equation (A), and the obtained value is defined as a fixing ratio. As the value of the fixing ratio, an arithmetic mean value of the values obtained from 100 samples is adopted.

(i) Sample Preparation

In the preparation of the sample, a sample press molding machine MAEKAWA Testing Machine (manufactured by MFG Co., LTD.) is used. The toner is placed in an aluminum ring (model number: 3481E1) in an amount of 0.5 g, a load is set to 5.0 tons, and the toner is pressed for 1 minute, thereby pelletizing the toner.

(ii) Example of Used Apparatus

X-Ray fluorescence spectrometer 3080 (manufactured by Rigaku Corporation)

(iii) Measurement Conditions

Measurement diameter: 10

Measurement potential and voltage: 50 kV, 50 to 70 mA

2θ angle: 25.12°

Crystal plate: LiF

Measurement time: 60 seconds (iv) Method of Calculating Fixing Ratio of Iron Oxide Particle $$\text{Fixing ratio (\%) of iron oxide particle}=(\text{strength of element derived from iron oxide particle of toner after treatment}/\text{strength of element derived from iron oxide particle of toner before treatment})\times 100 \quad \text{(A)}$$

<Method of Calculating SP Value>

A solubility parameter (SP value) is determined using a Fedors's equation represented by the following Equation (B).

$$\delta i=(Ev/V)1/2=(\Delta ei/\Delta vi)1/2 \quad \text{(B)}$$

Ev: evaporation energy

V: molar volume

Δei: evaporation energy of atom or atom group of component i

Δvi: molar volume of atom or atom group of component i

The values of Δei and Δvi refer to "Evaporation Energies and Molar Volumes (25° C.) of Atoms and Atom Groups described in Table 3-9 of Basic Coating Science", pp. 54 to 57, 1986 (Maki Shoten K.K.).

In Equation (B), "δi" is an SP value of an atom or an atom group of a component i, and an SP value of a target substance is obtained as a sum of SP values δi of atoms or atom groups of the target substance.

In the present invention, the SP value of the compound having a structure represented by Formula (1) is an SP value calculated using Equation (B) based on a structure of the hydrophobic treatment agent used to form the compound having a structure represented by Formula (1) on the surface of the iron oxide particle.

In addition, a unit of the SP value is $(cal/cm^3)^{1/2}$ and can be converted into a unit of $(J/m^3)^{1/2}$ by $1\ (cal/cm^3)^{1/2}=2.046\times10^3\ (J/m^3)^{1/2}$.

<Method of Measuring Wettability of Iron Oxide Particle>

In a wettability test of the iron oxide particle using a water/methanol mixed solvent, a methanol addition transmittance curve obtained performing measurement under the following conditions and procedures using a powder wettability tester (trade name: WET-100P, manufactured by RHESCA CO., LTD.) is used.

First, 50 mL of water is placed in a flask, and a transmittance is measured. The transmittance at this time is set to 100%, and a transmittance in a state in which no light is transmitted is set to 0%. Then, the transmittance is measured while methanol is continuously added to water so as to increase a concentration of methanol. The concentration (mass %) of methanol when an intensity of the transmitted light at the time of measurement is half of an intensity of the transmitted light at the time at which light passes through water is defined as wettability of the iron oxide particle.

Specifically, the transmittance is measured as follows.

A magnetic stirrer is placed in a beaker containing 50 mL of water. Then, 0.1 g of the iron oxide particle sieved with a mesh having an opening of 100 μm is precisely weighed and placed in the flask.

Next, stirring is started by a magnetic stirrer at a stirring speed of 300 rpm (5 revolutions/sec), and methanol is continuously added into the sample solution for the measurement at an addition rate of 1.3 mL/min by a glass tube. In addition, at this time, a transmittance of light having a wavelength of 780 nm is measured to create a methanol addition transmittance curve. At this time, the reason why methanol is used as a titration solvent is that the influence of elution of the hydrophobic treatment agent for treating the surface of the iron oxide particle is small, and the surface properties of the iron oxide particle can be more accurately evaluated.

In the measurement, for example, a glass beaker having a diameter of 5 cm may be used the beaker, and a spindle-shaped beaker having a length of 25 mm and a maximum diameter of 8 mm and is coated with Teflon (registered trademark) may be used as the magnetic stirrer.

<Measurement of Weight Average Particle Diameter (D4) and Number Average Particle Diameter (D1) of Toner Particles>

A weight average particle diameter (D4) and a number average particle diameter (D1) of the toner particles are measured with 25,000 effective measurement channels using dedicated software attached for the following apparatus, measurement condition setting, and analysis of the measured data, and the measured data is analyzed and calculated.

Apparatus: precise particle diameter distribution measuring apparatus "Coulter Counter Multisizer 3" (registered trademark, manufactured by Beckman Coulter, Inc.) equipped with a 100 μm aperture tube and operated by pore electrical resistance method Dedicated software: "Beckman Coulter Multisizer 3 Version 3.51" (manufactured by Beckman Coulter, Inc.)

An aqueous electrolyte solution used in the measurement is prepared by dissolving special-grade sodium chloride in ion exchange water to have a concentration of about 1 mass %, and for example, "ISOTON II" (manufactured by Beckman Coulter, Inc.) can be used.

Before the measurement and analysis are performed, the dedicated software is set as follows.

In the "change standard measurement method (SOM) screen" of the dedicated software, a total count number of a control mode is set to 50,000 particles, the number of times of measurement is set to 1, and a value obtained by using "10.0 μm standard particle" (manufactured by Beckman Coulter, Inc.) is set as a Kd value. A threshold and a noise level are automatically set by pressing a threshold/noise level measurement button. In addition, a current is set to 1,600 μA, a gain is set to 2, and an electrolyte solution is set to ISOTON II, and a check is entered for flushing an aperture tube after measurement.

In the "setting of conversion from pulse to particle diameter screen" of the dedicated software, a bin interval is set to a logarithmic particle diameter, a particle diameter bin is set to a particle diameter bin of 256, and a particle diameter range is set from 2 to 60 μm.

A specific measurement method is as follows.

(1) About 200 mL of the aqueous electrolyte solution is placed in a 250 mL round-bottom glass beaker dedicated for Multisizer 3, the beaker is set in a sample stand, and stirring is performed with a stirrer rod at 24 rotation/sec in a counterclockwise direction. Then, dirt and air bubbles in the aperture tube are removed by a "flush of aperture" function of the dedicated software.

(2) About 30 mL of the aqueous electrolyte solution is placed in a 100 mL flat-bottom glass beaker. About 0.3 mL of a diluted solution obtained by diluting "Contaminon N" (a 10 mass % aqueous solution of a neutral detergent for washing a precise measuring apparatus containing a nonionic surfactant, an anionic surfactant, and an organic builder and having a pH of 7, manufactured by Wako Pure Chemical Industries, Ltd.) with ion exchange water 3 mass times is added as a dispersant to the aqueous electrolyte solution.

(3) A predetermined amount of ion exchange water is placed in a water tank of an ultrasonic disperser "Ultrasonic Dispersion System Tetora 150" (manufactured by Nikkaki Bios Co., Ltd.) having two internal oscillators having an oscillatory frequency of 50 kHz shifted out of phase by 180° and having an electrical output of 120 W, and about 2 mL of the Contaminon N is added to the water tank.

(4) The beaker of (2) is set in a fixing hole of the beaker of the ultrasonic disperser and the ultrasonic disperser is operated. Then, a height position of the beaker is adjusted so that a resonance state of a level of the aqueous electrolyte solution in the beaker is maximized.

(5) About 10 mg of the toner (particle) is gradually added to and dispersed in the aqueous electrolyte solution in the beaker of (4) in a state where the aqueous electrolyte solution is irradiated with ultrasonic waves. Then, an ultrasonic dispersion treatment is further continued for 60 seconds. In the ultrasonic dispersion treatment, a water temperature in the water tank is appropriately adjusted so that the temperature is 10 to 40° C.

(6) The aqueous electrolyte solution of (5) in which the toner particle is dispersed is added dropwise to the round-bottom beaker of (1) installed in the sample stand using a pipette to adjust a measurement concentration to about 5%. Then, the measurement is performed until the number of measured particles reaches 50,000.

(7) The measured data are analyzed with the dedicated software attached to the apparatus to calculate the weight average particle diameter (D4). An "average diameter" on the analysis/volume statistical value (arithmetic average) screen when graph/vol % is set with the dedicated software is the weight average particle diameter (D4). In addition, an "average diameter" on the "analysis/number statistical value (arithmetic average)" screen when graph/number % is set with the dedicated software is the number average particle diameter (D1).

<Method of Measuring Half-Value Width of Endothermic Peak of Toner>

A half-value width of the endothermic peak of the toner is measured using a differential scanning calorimeter "Q 1000" (manufactured by TA Instruments) as follows.

For a temperature correction of a detection unit of the apparatus, melting points of indium and zinc are used, and for correction of the quantity of heat, the heat of fusion of indium is used.

As a measurement sample, 3.0 mg of the toner is precisely weighed and placed in an aluminum pan, and an empty aluminum pan is used as a reference.

After holding the temperature at 20° C. for 1 minute, in the first temperature increasing process, the measurement sample is measured while increasing the temperature from 30° C. to 200° C. at 100° C./min.

Next, after holding the temperature at 200° C. for 1 minute, measurement is performed while decreasing the temperature from 200° C. to 30° C. at −100° C./min.

Finally, after holding the temperature at 30° C. for 1 minute, measurement in the second temperature increasing process is performed while increasing the temperature from 30° C. to 200° C. at 100° C./min.

In the second temperature increasing process, a specific heat change is obtained in a temperature range of 40 to 200° C., and an endothermic peak derived from melting of the releasing agent is obtained. A melting point Tm (° C.) of the releasing agent in the second temperature increasing process is a peak temperature of the highest endothermic peak in the specific heat change curve, and the half-value width of the endothermic peak is a temperature width at the midpoint between the quantity of heat at the peak temperature of the highest endothermic peak and the baseline.

<Method of Measuring IR and Calculating [Si—O—Si]/[Si—C] Value>

The FT-IR spectrum is measured by an ATR method using the following apparatus.

Fourier-transform infrared spectrophotometer (Spectrum One, manufactured by PerkinElmer Inc.) equipped with universal ATR measurement accessory (Universal ATR Sampling Accessory)

A specific measurement procedure is as follows.

An incident angle of infrared light ($\lambda$=5 μm) is set to 45°. A Ge ATR crystal (refractive index: 4.0) is used as the ATR crystal. Other conditions are as follows.

Range

Start: 4000 $cm^{-1}$

End: 600 $cm^{-1}$

Duration

Scan number: 16

Resolution: 4.00 $cm^{-11}$

[Method of Calculating Hydrocarbon-Based Wax Index (Ge)]

(1) The Ge ATR crystals are mounted in the apparatus.

(2) On the ATR crystals, 0.01 g of a toluene extract of the iron oxide particle is weighed.

(3) The sample is pressurized with a pressure arm to be measured. (Force Gauge is 90)

(4) The obtained FT-IR spectrum is subjected to baseline correction by Automatic Correction.

(5) A ratio [Si—O—Si]/[Si—C] of a maximum absorption peak intensity [Si—O—Si] in a range of 990 to 1,040 cm' to a maximum absorption peak intensity [Si—C] in a range of 1,240 to 1,280 cm' is calculated.

According to the present invention, it is possible to provide a toner that can improve a release performance in a fixing step and suppress member-staining and has a small peeling amount from an image and excellent rubbing fixability.

EXAMPLES

Hereinafter, the present invention will be described more specifically with reference to production examples and examples, and the present invention is not limited by these examples. All the number of parts in the following formulations are part(s) by mass.

Production Example of Iron Oxide Particle C1

A caustic soda solution, $P_2O_5$, and $SiO_2$ were mixed with each other in an aqueous ferrous sulfate solution in amounts as shown below to prepare an aqueous solution containing ferrous hydroxide.

Caustic soda solution: 1.00 to 1.10 equivalents with respect to iron element $P_2O_5$: amount corresponding to 0.15 mass % in terms of phosphorus element with respect to iron element $SiO_2$: amount corresponding to 0.50 mass % in terms of silicon element with respect to iron element A pH of the aqueous solution was set to 8.0, and an oxidation reaction was performed at 85° C. while air was blown, thereby preparing a slurry solution containing seed crystals.

Next, an aqueous ferrous sulfate solution was added to the slurry solution so that the amount thereof was 0.90 to 1.20 equivalents with respect to the initial alkali amount (sodium component of caustic soda). Thereafter, a pH of the slurry solution was maintained at 7.6, and an oxidation reaction was allowed to proceed while air was blown, thereby obtaining a slurry solution containing iron oxide.

Filtration and washing were performed, and then a water-containing slurry solution was temporarily taken out. At this time, a small amount of a water-containing sample was collected and a water content was measured.

Next, the water-containing sample was introduced into a separate aqueous medium without being dried, and re-dispersion was performed with a pin mill while circulating and stirring the slurry, thereby adjusting a pH of the re-dispersion liquid to about 9.0. Then, an iso-butyltrimethoxysilane coupling agent was added in an amount of 1.4 parts by mass with respect to 100 parts by mass of the iron oxide particle (the amount of iron oxide particle was calculated as a value obtained by subtracting the water content from the water-containing sample) while stirring was performed, and hydrolysis was performed at a liquid temperature of 45° C. Thereafter, stirring was sufficiently performed and a surface treatment was performed.

The produced iron oxide particle subjected to the hydrophobic treatment was filtered by a filter press, the filtered particle was washed with a large amount of water, the washed particle was dried at 120° C. for 2 hours, and the obtained particle was pulverized, thereby obtaining iron oxide particles C1 having a number average particle diameter (D1) of 0.26 μm.

Production Example of Iron Oxide Particles C2 to C8

In the production example of the iron oxide particle C1, the initial pH of the re-dispersion liquid of the slurry was set to the pH (A) shown in Table 1, the hydrophobic treatment agent shown in Table 1 was added, hydrolysis was performed, the pH was changed to the pH (B) shown in Table 1, and then, the surface treatment was performed. Except for the above, iron oxide particles C2 to C8 were obtained by the same apparatus and under the same conditions as in the production of the iron oxide particle C1.

Production Example of Iron Oxide Particle C9

A caustic soda solution, $P_2O_5$, and $SiO_2$ were mixed with each other in an aqueous ferrous sulfate solution in amounts as shown below to prepare an aqueous solution containing ferrous hydroxide.

Caustic soda solution: 1.00 to 1.10 equivalents with respect to iron element $P_2O_5$: amount corresponding to 0.15 mass % in terms of phosphorus element with respect to iron element $SiO_2$: amount corresponding to 0.50 mass % in terms of silicon element with respect to iron element A pH of the aqueous solution was set to 8.0, and an oxidation reaction was performed at 85° C. while air was blown, thereby preparing a slurry solution containing seed crystals.

Next, an aqueous ferrous sulfate solution was added to the slurry solution so that the amount thereof was 0.90 to 1.20 equivalents with respect to the initial alkali amount (sodium component of caustic soda). Thereafter, a pH of the slurry solution was maintained at 7.6, an oxidation reaction was allowed to proceed while air was blown, the pH was adjusted to 6 at the end of the oxidation reaction, and washing and drying were performed. The obtained particle was pulverized to obtain iron oxide particles having a number average particle diameter (D1) of 0.23 μm.

As a hydrophobic treatment agent, 30 parts by mass of iso-butyltrimethoxysilane was added dropwise to 70 parts by mass of ion exchange water while stirring was performed. Thereafter, the aqueous solution was held at a pH of 5.5 and a temperature of 55° C. and was dispersed at a peripheral speed of 0.46 m/s for 120 minutes using a disper blade, and hydrolysis was performed. Thereafter, the pH of the aqueous solution was set to 7.0, and the aqueous solution was cooled to 10° C. to stop the hydrolysis reaction. Thus, an aqueous solution containing a silane compound was obtained.

In a high-speed mixer (trade name: LFS-2 type, manufactured by Fukae Powtec Corporation), 100 parts by mass of the iron oxide particle was placed, and 8.0 parts by mass of the aqueous solution containing a silane compound was added dropwise over 2 minutes while stirring was performed at a number of revolutions of 2,000 rpm. Thereafter, mixing and stirring were performed for 5 minutes. Next, in order to improve fixability of the silane compound, the mixture was dried at 40° C. for 1 hour to reduce the amount of moisture, the mixture was dried at 110° C. for 3 hours, and then, a condensation reaction of the silane compound was allowed to proceed. Thereafter, the condensate was pulverized and passed through a sieve having an opening of 100 μm, thereby obtaining an iron oxide particle C9.

Production Example of Iron Oxide Particles C10 to C16

In the production example of the iron oxide particle C9, and the type of the hydrophobic treatment agent used was changed as shown in Table 1. Except for the above, iron oxide particles C10 to $C_{16}$ were obtained by the same apparatus and under the same conditions as in the production of the iron oxide particle C9.

Production Example of Iron Oxide Particle C17

A caustic soda solution, $P_2O_5$, and $SiO_2$ (amount corresponding to 0.50 mass % in terms of silicon element with respect to iron element) were mixed with each other in an aqueous ferrous sulfate solution in amounts as shown below to prepare an aqueous solution containing ferrous hydroxide.

Caustic soda solution: 1.00 to 1.10 equivalents with respect to iron element $P_2O_5$: amount corresponding to 0.15 mass % in terms of phosphorus element with respect to iron element $SiO_2$: amount corresponding to 0.50 mass % in terms of silicon element with respect to iron element A pH of the aqueous solution was set to 8.0, and an oxidation reaction was performed at 85° C. while air was blown, thereby preparing a slurry solution containing seed crystals.

Next, an aqueous ferrous sulfate solution was added to the slurry solution so that the amount thereof was 0.90 to 1.20 equivalents with respect to the initial alkali amount (sodium component of caustic soda). Thereafter, a pH of the slurry solution was maintained at 7.6, an oxidation reaction was allowed to proceed while air was blown, and the pH was adjusted to 6 at the end of the oxidation reaction. Thereafter, washing and drying were performed, and the obtained particle was pulverized, thereby obtaining iron oxide particles having a number average particle diameter (D1) of 0.23 μm.

The iron oxide particle was placed in a Henschel mixer (manufactured by NIPPON COKE & ENGINEERING CO., LTD.), 3.8 parts by mass of dimethylsilicone oil was added while being sprayed in a state where the untreated iron oxide particle was dispersed at a rotation speed of 34.5 m/s, and the iron oxide particle was dispersed as they were for 10 minutes. Thereafter, the iron oxide particle passed through a sieve having an opening of 100 μm was obtained as an iron oxide particle C17.

Production Example of Iron Oxide Particle C18

An iron oxide particle C18 was obtained by the same apparatus and under the same conditions as in the production example of the iron oxide particle C17, except that the type and use amount of hydrophobic treatment agent were changed to modified silicone oil KF-415 (manufactured by Shin-Etsu Silicone Co., Ltd.) and 3.8 parts by mass, respectively, in the production example of the iron oxide particle C17.

Production Example of Iron Oxide Particle C19

A caustic soda solution, $P_2O_5$, and $SiO_2$ were mixed with each other in an aqueous ferrous sulfate solution in amounts as shown below to prepare an aqueous solution containing ferrous hydroxide.

Caustic soda solution: 1.00 to 1.10 equivalents with respect to iron element $P_2O_5$: amount corresponding to 0.15 mass % in terms of phosphorus element with respect to iron element $SiO_2$: amount corresponding to 0.50 mass % in terms of silicon element with respect to iron element A pH of the aqueous solution was set to 8.0, and an oxidation reaction was performed at 85° C. while air was blown, thereby preparing a slurry solution containing seed crystals.

Next, an aqueous ferrous sulfate solution was added to the slurry solution so that the amount thereof was 0.90 to 1.20 equivalents with respect to the initial alkali amount (sodium component of caustic soda). Thereafter, a pH of the slurry solution was maintained at 7.6, an oxidation reaction was allowed to proceed while air was blown, and the pH was adjusted to 6 at the end of the oxidation reaction. Thereafter, washing and drying were performed, and the obtained particle was pulverized, thereby obtaining iron oxide particles having a number average particle diameter (D1) of 0.23 μm.

As a hydrophobic treatment agent, 30 parts by mass of iso-propyl triisostearoyl titanate was added dropwise to 70 parts by mass of ion exchange water while stirring was performed. Thereafter, the aqueous solution was held at a pH of 5.5 and a temperature of 55° C. and was dispersed at a peripheral speed of 0.46 m/s for 120 minutes using a disper blade, and hydrolysis was performed. Thereafter, the pH of the aqueous solution was set to 7.0, and the aqueous solution was cooled to 10° C. to stop the hydrolysis reaction. Thus, an aqueous solution containing a titanate compound was obtained.

In a high-speed mixer (trade name: LFS-2 type, manufactured by Fukae Powtec Corporation), 100 parts by mass of the iron oxide particle was placed, and 8.0 parts by mass of the aqueous solution containing a titanate compound was added dropwise over 2 minutes while stirring was performed at a number of revolutions of 2,000 rpm. Thereafter, mixing and stirring were performed for 5 minutes. Next, in order to improve fixability of the titanate compound, the mixture was dried at 40° C. for 1 hour to reduce the amount of moisture, the mixture was dried at 110° C. for 3 hours, and then, a condensation reaction of the titanate compound was allowed to proceed. Thereafter, the condensate was pulverized and passed through a sieve having an opening of 100 μm, thereby obtaining an iron oxide particle C19.

Production Example of Iron Oxide Particle C20

A caustic soda solution, $P_2O_5$, and $SiO_2$ were mixed with each other in an aqueous ferrous sulfate solution in amounts as shown below to prepare an aqueous solution containing ferrous hydroxide.

Caustic soda solution: 1.00 to 1.10 equivalents with respect to iron element $P_2O_5$: amount corresponding to 0.15 mass % in terms of phosphorus element with respect to iron element $SiO_2$: amount corresponding to 0.50 mass % in terms of silicon element with respect to iron element A pH of the aqueous solution was set to 8.0, and an oxidation reaction was performed at 85° C. while air was blown, thereby preparing a slurry solution containing seed crystals.

Next, an aqueous ferrous sulfate solution was added to the slurry solution so that the amount thereof was 0.90 to 1.20 equivalents with respect to the initial alkali amount (sodium component of caustic soda). Thereafter, a pH of the slurry solution was maintained at 7.6, an oxidation reaction was allowed to proceed while air was blown, and the pH was adjusted to 6 at the end of the oxidation reaction. Thereafter, washing and drying were performed, and the obtained particle was pulverized, thereby obtaining iron oxide particles having a number average particle diameter (D1) of 0.23 μm.

Next, the iron oxide particle was added to a dilute sulfuric acid solution to adjust the pH to 4. Next, an aqueous aluminum sulfate solution was gradually added and sufficiently mixed. An aqueous sodium hydroxide solution was gradually added while stirring was performed was further continued to adjust the pH of the suspension to 6, and then, the suspension was aged. Thereafter, washing and drying were performed, and the obtained particle was pulverized, thereby obtaining iron oxide particles C20 having a number average particle diameter (D1) of 0.23 μm.

Production Example of Iron Oxide Particle C21

In the production example of the iron oxide particle C9, the type of the hydrophobic treatment agent was changed to tetramethoxysilane. Except for the above, an iron oxide particle C21 was obtained by the same apparatus and under the same conditions as in the production example of the iron oxide particle C9.

Production Example of Iron Oxide Particle C22

In the production example of the iron oxide particle C17, the type and use amount of hydrophobic treatment agent were changed to hexamethyldisilazane and 3.8 parts by mass, respectively. Except for the above, an iron oxide particle C22 was obtained by the same apparatus and under the same conditions as in the production example of the iron oxide particle C17.

Production Example of Iron Oxide Particle C23

A caustic soda solution, $P_2O_5$, and $SiO_2$ were mixed with each other in an aqueous ferrous sulfate solution in amounts as shown below to prepare an aqueous solution containing ferrous hydroxide.

Caustic soda solution: 1.00 to 1.10 equivalents with respect to iron element $P_2O_5$: amount corresponding to 0.15 mass % in terms of phosphorus element with respect to iron element $SiO_2$: amount corresponding to 0.50 mass % in terms of silicon element with respect to iron element A pH of the aqueous solution was set to 8.0, and an oxidation reaction was performed at 85° C. while air was blown, thereby preparing a slurry solution containing seed crystals.

Next, an aqueous ferrous sulfate solution was added to the slurry solution so that the amount thereof was 0.90 to 1.20 equivalents with respect to the initial alkali amount (sodium component of caustic soda). Thereafter, a pH of the slurry solution was maintained at 7.6, an oxidation reaction was allowed to proceed while air was blown, and the pH was adjusted to 6 at the end of the oxidation reaction. Thereafter, washing and drying were performed, and the obtained particle was pulverized, thereby obtaining iron oxide particles C23 having a number average particle diameter (D1) of 0.23 μm. The iron oxide particle C23 is an iron oxide particle that is not subjected to a surface treatment.

TABLE 1

| Iron oxide particle | Hydrophobic treatment condition: Treatment method | pH(A) | pH(B) | Hydrophobic treatment agent | Number of carbon atoms of alkyl substituent |
|---|---|---|---|---|---|
| C1 | Wet type | 9.0 | 9.0 | iso-Butyltrimethoxysilane | 4 |
| C2 | Wet type | 4.8 | 8.6 | iso-Butyltrimethoxysilane | 4 |
| C3 | Wet type | 9.3 | 9.0 | iso-Butyltrimethoxysilane | 4 |
| C4 | Wet type | 10.0 | 9.0 | iso-Butyltrimethoxysilane | 4 |
| C5 | Wet type | 4.5 | 8.6 | iso-Butyltrimethoxysilane | 4 |
| C6 | Wet type | 4.5 | 8.6 | n-Hexyltrimethoxysilane | 6 |
| C7 | Wet type | 4.5 | 8.6 | n-Octyltrimethoxysilane | 8 |
| C8 | Wet type | 4.5 | 8.6 | n-Decyltrimethoxysilane | 10 |
| C9 | Dry type | 5.5 | 7.0 | iso-Butyltrimethoxysilane | 4 |
| C10 | Dry type | 5.5 | 7.0 | n-Hexyltrimethoxysilane | 6 |
| C11 | Dry type | 5.5 | 7.0 | n-Octyltrimethoxysilane | 8 |
| C12 | Dry type | 5.5 | 7.0 | n-Decyltrimethoxysilane | 10 |
| C13 | Dry type | 5.5 | 7.0 | Methyltrimethoxysilane | 1 |
| C14 | Dry type | 5.5 | 7.0 | iso-Propyltrimethoxysilane | 3 |
| C15 | Dry type | 5.5 | 7.0 | n-Dodecyltrimethoxysilane | 20 |
| C16 | Dry type | 5.5 | 7.0 | γ-Methacryloxypropyltrimethoxysilane | Non-alkyl |
| C17 | Dry type | — | — | Dimethylsilicone oil | 1 |
| C18 | Dry type | — | — | Modified-silicone oil KF-415 | 8 |
| C19 | Dry type | — | — | Isopropyl triisostearoyl titanate | Non-alkyl |
| C20 | Dry type | — | — | Aluminum sulfate | — |
| C21 | Dry type | — | — | Tetramethoxysilane | — |
| C22 | Dry type | — | — | Hexamethyldisilazane | 1 |
| C23 | Dry type | — | — | — | — |

Physical property values of the iron oxide particles C1 to C23 produced as described above are shown in Table 2, the physical property value being determined by the methods described above.

TABLE 2

| Iron oxide particle | Average primary particle diameter (μm) | SP value ((cal/cm$^3$)$^{1/2}$) of compound of Formula (1) | NEXAFS IA/(IA + IB)/Msi (g/mol) | FT-IR spectrum [Si—O—Si]/[Si—C] | Wettability (%) |
|---|---|---|---|---|---|
| C1 | 0.26 | 7.55 | 47 | 1.6 | 65 |
| C2 | 0.26 | 7.55 | 42 | 1.5 | 72 |
| C3 | 0.26 | 7.55 | 48 | 1.6 | 62 |
| C4 | 0.26 | 7.55 | 55 | 1.7 | 60 |

TABLE 2-continued

| Iron oxide particle | Average primary particle diameter (μm) | SP value ((cal/cm$^3$)$^{1/2}$) of compound of Formula (1) | NEXAFS IA/(IA + IB)/Msi (g/mol) | FT-IR spectrum [Si—O—Si]/[Si—C] | Wettability (%) |
|---|---|---|---|---|---|
| C5 | 0.26 | 7.55 | 40 | 1.5 | 52 |
| C6 | 0.26 | 7.85 | 44 | 1.6 | 73 |
| C7 | 0.26 | 8.01 | 48 | 1.6 | 74 |
| C8 | 0.26 | 8.11 | 52 | 1.7 | 75 |
| C9 | 0.23 | 7.55 | 33 | 1.4 | 73 |
| C10 | 0.23 | 7.85 | 34 | 1.4 | 74 |
| C11 | 0.23 | 8.01 | 35 | 1.4 | 75 |
| C12 | 0.23 | 8.11 | 31 | 1.4 | 75 |
| C13 | 0.23 | 5.80 | 33 | 1.3 | 68 |
| C14 | 0.23 | 7.28 | 30 | 1.3 | 69 |
| C15 | 0.23 | 8.33 | 55 | 1.3 | 80 |
| C16 | 0.23 | 10.87 | 38 | 1.3 | 40 |
| C17 | 0.23 | 8.00 | — | — | 50 |
| C18 | 0.23 | 8.01 | — | — | 50 |
| C19 | 0.23 | 7.48 | — | — | 50 |
| C20 | 0.23 | — | — | — | 30 |
| C21 | 0.23 | — | — | — | 30 |

TABLE 2-continued

| Iron oxide particle | Average primary particle diameter (μm) | SP value ((cal/cm$^3$)$^{1/2}$) of compound of Formula (1) | NEXAFS IA/(IA + IB)/Msi (g/mol) | FT-IR spectrum [Si—O—Si]/[Si—C] | Wettability (%) |
|---|---|---|---|---|---|
| C22 | 0.23 | 5.80 | — | — | 65 |
| C23 | 0.23 | — | — | — | 30 |

Production Example of Magnetic Body (Colorant)

To 92 L of an aqueous ferrous sulfate solution having an Fe' concentration of 1.79 mol/L, 88 L of an aqueous solution of 3.74 mol/L of sodium hydroxide was added, and mixing and stirring were performed while air was blown at 20 L/min so as to maintain the temperature and the pH to 89° C. and 9 to 12, respectively. After mixing and stirring for 30 minutes, the slurry was filtered, washed, and dried to obtain a particle of a magnetic body.

Production Example of Toner Particle A1

The following raw materials were prepared.

| | |
|---|---|
| Amorphous polyester resin (PES) (amorphous polyester resin obtained by condensation reaction of ethylene oxide and propylene oxide adduct of bisphenol A and terephthalic acid, Mw = 9,500, Tg = 58° C.) | 100 parts by mass |
| Magnetic body (colorant) (number average particle diameter (D1): 0.20 μm, magnetic characteristics (σs: 65.9 $Am^2/kg$, σr: 7.3 $Am^2/kg$), no surface treatment) | 95 parts by mass |
| Releasing agent B1 (behenyl behenate, melting point: 75° C.) | 5.0 parts by mass |
| Iron complex of monoazo dye (T-77, manufactured by Hodogaya Chemical Co., Ltd.) | 2.0 parts by mass |

These raw materials were pre-mixed by a Henschel mixer FM10C (manufactured by Mitsui Miike Chemical Engineering Machinery Co., Ltd.). Thereafter, the raw materials were kneaded by a twin-screw kneader (trade name: PCM-30, manufactured by Ikegai Corp.) set at a number of revolutions of 250 rpm at a set temperature being adjusted so that a direct temperature in the vicinity of the outlet for a kneaded product was 145° C.

The obtained melt-kneaded product was cooled, and the cooled melt-kneaded product was coarsely pulverized with a cutter mill. Therefore, the obtained coarsely pulverized product was finely pulverized using a turbo T-250 (manufactured by Turbo Kogyo Co., Ltd.) at a feed rate of 25 kg/hr by adjusting an air temperature so that an exhaust temperature was 38° C., and classification was performed using a multi-grade classifier using a Coanda effect. As a result, toner particles A1 having a weight average particle diameter (D4) of 8.4 μm were obtained.

Production Example of Toner Particles A2 to A4

In the production example of the toner particle A1, the type of the releasing agent used was changed as shown in Table 3. Except for the above, toner particles A2 to A4 were obtained by the same apparatus and under the same conditions as in the production example of the toner particle A1.

Production Example of Toner Particle A5

The following raw materials were prepared.

| | |
|---|---|
| Styrene/n-butyl acrylate copolymer 1 (StAc) (styrene acrylic resin (mass ratio of styrene to n-butyl acrylate: 78:22), Mw = 8,500, Tg = 58° C.) | 100.0 parts by mass |
| Magnetic body (number average particle diameter (D1): 0.20 μm, magnetic characteristics (σs: 65.9 $Am^2/kg$, σr: 7.3 $Am^2/kg$), no surface treatment) | 95.0 parts by mass |
| Releasing agent B1 (behenyl behenate, melting point: 75° C.) | 5.0 parts by mass |
| Iron complex of monoazo dye (trade name: T-77, manufactured by Hodogaya Chemical Co., Ltd.) | 2.0 parts by mass |

These raw materials were treated by the same apparatus and under the same conditions as in the production example of the toner particle A1, thereby obtaining a toner particle A5.

<Production of Toner Particles A6 to A8>

In the production example of the toner particle A5, the releasing agent used was changed as shown in Table 3. Except for the above, toner particles A6 to A8 were obtained by the same apparatus and under the same conditions as in the production example of the toner particle A5.

Production Example of Toner Particle A9

A toner particle A9 was produced by an emulsion aggregation method according to the following procedure.

Styrene, butyl acrylate, acrylic acid, and n-lauryl mercaptan were mixed and dissolved in amounts of 89.5 parts, 9.2 parts, 1.3 parts, and 3.2 parts, respectively. An aqueous solution was prepared by mixing 1.5 parts of Neogen RK (manufactured by DKS Co., Ltd.) with 150 parts of ion exchange water, and the mixture was added to and dispersed in the mixed solution prepared described above.

An aqueous potassium persulfate solution was prepared by mixing 0.3 parts of potassium persulfate with 10 parts of ion exchange water. An aqueous potassium persulfate solution was added while the mixed solution was slowly stirred for 10 minutes.

After nitrogen replacement, emulsion polymerization was performed at 70° C. for 6 hours. After the completion of the polymerization, a reaction solution was cooled to room temperature and ion exchange water was added, thereby obtaining a binder resin particle dispersion liquid having a solid content concentration of 12.5 mass % and a volume-based median diameter of 0.2 μm.

A releasing agent (100 parts) (Fischer-Tropsch wax, melting point: 77° C.) and Neogen RK (15 parts) were mixed in 385 parts of ion exchange water, and the mixture was dispersed for about 1 hour using a wet jet mill JN100 (manufactured by JOKOH CO., LTD.), thereby obtaining a releasing agent dispersion liquid. A solid content concentration of the releasing agent dispersion liquid was 20 mass %.

A magnetic iron oxide particle (100 parts) and Neogen SC (10.0 parts) were mixed in 890 parts of ion exchange water, and the mixture was dispersed for about 1 hour using a wet jet mill JN100, thereby obtaining a magnetic iron oxide dispersion liquid.

A binder resin particle dispersion liquid (265 parts), a releasing agent dispersion liquid (10 parts), and a magnetic iron oxide dispersion liquid (65 parts) were placed in a vessel, and the mixture was dispersed using a homogenizer (trade name: Ultra Turrax T50, manufactured by IKA Works Inc.).

The temperature in the vessel was adjusted to 30° C. while the mixture was stirred, and 1 mol/L of hydrochloric acid was added to adjust the pH to 5.0. After leaving for 3 minutes, the temperature was started to be increased, and the temperature was increased to 50° C. to produce an aggregated particle. In this state, a particle diameter of the aggregated particles was measured by a "Coulter Counter Multisizer 3" (registered trademark, manufactured by Beckman Coulter, Inc.). At the time when a weight average particle diameter of the aggregated particles was 6.2 μm, 1 mol/L of an aqueous sodium hydroxide solution was added, and the pH was adjusted to 8.0 to stop the growth of the particle.

Thereafter, the temperature was increased to 95° C. to fuse and spheroidize the aggregated particle. At the time when an average circularity reached 0.980, the temperature was started to be decreased, and the temperature was decreased to 30° C., thereby obtaining a toner particle dispersion liquid.

Hydrochloric acid was added to the obtained toner particle dispersion liquid to adjust the pH to 1.5 or less, and the mixture was stirred and left for 1 hour and then subjected to solid-liquid separation with a pressure filter, thereby obtaining a toner cake.

The toner cake was reslurried with ion exchange water into a dispersion liquid, and the dispersion liquid was subjected to solid-liquid separation with the filter described above. Reslurrying and solid-liquid separation were repeated until an electric conductivity of the filtrate was 5.0 μS/cm or less, and then final solid-liquid separation was performed, thereby obtaining a toner cake.

The obtained toner cake was dried with a flash dryer (Flash Jet Dryer, manufactured by Seishin Enterprise Co., Ltd.). The drying was performed under the conditions in which a blowing temperature was 90° C., a dryer outlet temperature was 40° C., a toner cake feed rate was adjusted so that the outlet temperature was not deviated from 40° C. depending on the water content of the toner cake.

Further, the fine coarse powder was cut using a multi-division classifier using the Coanda effect to obtain a toner particle A9. A weight average particle diameter (D4) of the toner particles A9 was 8.4 μm, an average circularity of the toner particles A9 was 0.980, and a glass transition temperature (Tg) of the toner particle A9 was 57° C.

Production Example of Toner Particles A10 to A12

In the production example of the toner particle A5, the type and use amount of the releasing agent were changed as shown in Table 3. Except for the above, toner particles A10 to A12 were obtained by the same apparatus and under the same conditions as in the production example of the toner particle A5.

Production Example of Toner Particle A13

In the production example of the toner particle A4, the use amount of the releasing agent used was changed as shown in Table 3. Except for the above, a toner particle A13 was obtained by the same apparatus and under the same conditions as in the production example of the toner particle A4.

The types of the releasing agents used for producing the toner particles A1 to A13 and the respective physical properties determined by the methods described above are shown in Table 3. As for the toner particles A1 to A13, the production conditions and the respective physical properties determined by the methods described above are shown in Table 4.

TABLE 3

| Releasing agent | Type | Molecular weight | Melting point (° C.) | SP value ((cal/cm$^3$)$^{1/2}$) |
|---|---|---|---|---|
| B1 | Behenyl behenate | 649 | 75 | 8.59 |
| B2 | Glycol dilaurate | 426 | 55 | 8.97 |
| B3 | Glycol distearate | 594 | 72 | 8.85 |
| B4 | Polyethylene | 1194 | 94 | 8.45 |
| B5 | Fischer-Tropsch wax | 283 | 77 | 8.11 |
| B6 | Carnauba wax | 675 | 83 | 8.57 |
| B7 | Dipentaerythritol hexalaurate | 1348 | 78 | 9.14 |

TABLE 4

| | | Binder resin | | Releasing agent | | | SP value difference | DSC endothermic |
|---|---|---|---|---|---|---|---|---|
| Toner particle | Production method | Type | SP value ((cal/cm$^3$)$^{1/2}$) | Type | SP value ((cal/cm$^3$)$^{1/2}$) | Use amount (parts) | between binder resin and releasing agent | peak half-value width (° C.) |
| A1 | Pulverization | PES | 11.50 | B1 | 8.59 | 5.0 | 2.91 | 4.5 |
| A2 | Pulverization | PES | 11.50 | B4 | 8.45 | 5.0 | 3.05 | 4.0 |
| A3 | Pulverization | PES | 11.50 | B3 | 8.85 | 5.0 | 2.65 | 4.5 |
| A4 | Pulverization | PES | 11.50 | B5 | 8.11 | 5.0 | 3.39 | 4.0 |
| A5 | Pulverization | StAc | 10.56 | B1 | 8.59 | 5.0 | 1.97 | 5.5 |
| A6 | Pulverization | StAc | 10.56 | B3 | 8.85 | 5.0 | 1.71 | 7.0 |
| A7 | Pulverization | StAc | 10.56 | B2 | 8.97 | 5.0 | 1.59 | 8.0 |
| A8 | Pulverization | StAc | 10.56 | B7 | 9.14 | 5.0 | 1.40 | 9.0 |
| A9 | Emulsion aggregation | StAc | 10.56 | B5 | 8.11 | 5.0 | 2.45 | 4.5 |

TABLE 4-continued

| | | Binder resin | | Releasing agent | | | SP value difference between binder resin and releasing agent | DSC endothermic peak half-value width (° C.) |
|---|---|---|---|---|---|---|---|---|
| Toner particle | Production method | Type | SP value ((cal/cm$^3$)$^{1/2}$) | Type | SP value ((cal/cm$^3$)$^{1/2}$) | Use amount (parts) | | |
| A10 | Pulverization | StAc | 10.56 | B4 | 8.45 | 5.0 | 2.11 | 5.0 |
| A11 | Pulverization | StAc | 10.56 | B5 | 8.11 | 2.0 | 2.45 | 4.8 |
| A12 | Pulverization | StAc | 10.56 | B6 | 8.57 | 5.0 | 1.99 | 6.2 |
| A13 | Pulverization | PES | 11.50 | B5 | 8.11 | 2.0 | 3.39 | 4.5 |

Production Example of Toner 1

The toner particle A1 (100 parts) and a hydrophobic silica particle (1 part) were mixed for 5 minutes using an FM mixer (trade name: FM-10B, manufactured by NIPPON COKE & ENGINEERING CO., LTD.) under a condition of a rotation speed of 3,500 rpm. In the production of the hydrophobic silica particle, 3-aminopropyltriethoxysilane and dimethylsilicone oil were used as hydrophobic treatment agents.

Next, 2.0 parts of the iron oxide particle C1 were injected into the FM mixer, and mixing was performed under a condition of a rotation speed of 3,000 rpm for 5 minutes, thereby obtaining a toner mixture.

Thereafter, a coarse particle was removed using a 300-mesh sieve (opening of 48 μm) to obtain a toner 1.

Production Example of Toners 2 to 16

In the production example of the toner 1, and the type of the iron oxide particle used was changed as shown in Table 5. Except for the above, toners 2 to 16 were obtained by the same apparatus and under the same conditions as in the production example of the toner 1.

Production Example of Toners 17 to 23

In the production example of the toner 1, and the types of the toner particle and iron oxide particle used were changed as shown in Table 5. Except for the above, toners 17 to 23 were obtained by the same apparatus and under the same conditions as in the production example of the toner 1.

Production Example of Toners 24 to 29

In the production example of the toner 1, the type of the toner particle used was changed to the toner particle A5, and the type of the iron oxide particle used was changed to the iron oxide particle C13, and the use amount of iron oxide particle was changed as shown in Table 5. Except for the above, toners 24 to 29 were obtained by the same apparatus and under the same conditions as in the production example of the toner 1.

Production Example of Toner 30

The toner particle A5 (100 parts) and a hydrophobic silica particle (1 part) were mixed for 5 minutes using an FM mixer (trade name: FM-10B, manufactured by NIPPON COKE & ENGINEERING CO., LTD.) under a condition of a rotation speed of 3,500 rpm. In the production of the hydrophobic silica particle, 3-aminopropyltriethoxysilane and dimethylsilicone oil were used as hydrophobic treatment agents.

Next, 0.1 parts of the iron oxide particle C5 were injected into the FM mixer, and mixing was performed under a condition of a rotation speed of 3,200 rpm for 3 minutes, thereby obtaining a toner mixture.

Thereafter, a coarse particle was removed using a 300-mesh sieve (opening of 48 μm) to obtain a toner 30.

Production Example of Toners 31 to 34

In the production example of the toner 30, the conditions when the iron oxide particle was subjected to the external addition treatment were changed as shown in Table 5. Except for the above, toners 31 to 34 were obtained by the same apparatus and under the same conditions as in the production example of the toner 30.

Production Example of Toner 35

In the production example of the toner 34, the type of the toner particle used was changed to the toner particle A9. Except for the above, a toner 35 was obtained by the same apparatus and under the same conditions as in the production example of the toner 34.

COMPARATIVE EXAMPLES

Production Example of Toners 36 to 42

In the production example of the toner 1, and the types of the toner particle and iron oxide particle used were changed as shown in Table 5. Except for the above, toners 36 to 42 were obtained by the same apparatus and under the same conditions as in the production example of the toner 1.

TABLE 5

| | | | Iron oxide particle | | Iron oxide particle external addition condition | |
|---|---|---|---|---|---|---|
| | Toner production method | Toner particle | Type | Use amount (parts) | Rotation speed (rpm) | Time (min) |
| Toner 1 | Pulverization | A1 | C1 | 2.00 | 3000 | 5.0 |
| Toner 2 | Pulverization | A1 | C2 | 2.00 | 3000 | 5.0 |

TABLE 5-continued

| | | | Iron oxide particle | | Iron oxide particle external addition condition | |
|---|---|---|---|---|---|---|
| | Toner production method | Toner particle | Type | Use amount (parts) | Rotation speed (rpm) | Time (min) |
| Toner 3 | Pulverization | A1 | C3 | 2.00 | 3000 | 5.0 |
| Toner 4 | Pulverization | A1 | C6 | 2.00 | 3000 | 5.0 |
| Toner 5 | Pulverization | A1 | C7 | 2.00 | 3000 | 5.0 |
| Toner 6 | Pulverization | A1 | C5 | 2.00 | 3000 | 5.0 |
| Toner 7 | Pulverization | A1 | C9 | 2.00 | 3000 | 5.0 |
| Toner 8 | Pulverization | A1 | C10 | 2.00 | 3000 | 5.0 |
| Toner 9 | Pulverization | A1 | C4 | 2.00 | 3000 | 5.0 |
| Toner 10 | Pulverization | A1 | C8 | 2.00 | 3000 | 5.0 |
| Toner 11 | Pulverization | A1 | C11 | 2.00 | 3000 | 5.0 |
| Toner 12 | Pulverization | A1 | C12 | 2.00 | 3000 | 5.0 |
| Toner 13 | Pulverization | A1 | C15 | 2.00 | 3000 | 5.0 |
| Toner 14 | Pulverization | A1 | C16 | 2.00 | 3000 | 5.0 |
| Toner 15 | Pulverization | A1 | C14 | 2.00 | 3000 | 5.0 |
| Toner 16 | Pulverization | A1 | C13 | 2.00 | 3000 | 5.0 |
| Toner 17 | Pulverization | A2 | C9 | 2.00 | 3000 | 5.0 |
| Toner 18 | Pulverization | A3 | C9 | 2.00 | 3000 | 5.0 |
| Toner 19 | Pulverization | A5 | C9 | 2.00 | 3000 | 5.0 |
| Toner 20 | Pulverization | A6 | C9 | 2.00 | 3000 | 5.0 |
| Toner 21 | Pulverization | A4 | C9 | 2.00 | 3000 | 5.0 |
| Toner 22 | Pulverization | A7 | C9 | 2.00 | 3000 | 5.0 |
| Toner 23 | Pulverization | A8 | C9 | 2.00 | 3000 | 5.0 |
| Toner 24 | Pulverization | A5 | C13 | 1.00 | 3000 | 5.0 |
| Toner 25 | Pulverization | A5 | C13 | 2.50 | 3000 | 5.0 |
| Toner 26 | Pulverization | A5 | C13 | 0.50 | 3000 | 5.0 |
| Toner 27 | Pulverization | A5 | C13 | 4.00 | 3000 | 5.0 |
| Toner 28 | Pulverization | A5 | C13 | 5.00 | 3000 | 5.0 |
| Toner 29 | Pulverization | A5 | C13 | 0.10 | 3000 | 5.0 |
| Toner 30 | Pulverization | A5 | C13 | 0.10 | 3200 | 3.0 |
| Toner 31 | Pulverization | A5 | C13 | 0.10 | 3000 | 3.0 |
| Toner 32 | Pulverization | A5 | C13 | 0.10 | 3500 | 3.0 |
| Toner 33 | Pulverization | A5 | C13 | 0.10 | 3000 | 2.0 |
| Toner 34 | Pulverization | A5 | C13 | 0.10 | 3600 | 3.0 |
| Toner 35 | Emulsion aggregation | A9 | C13 | 0.10 | 3600 | 3.0 |
| Toner 36 | Pulverization | A10 | C23 | 2.00 | 3000 | 5.0 |
| Toner 37 | Pulverization | A11 | C17 | 2.00 | 3000 | 5.0 |
| Toner 38 | Pulverization | A11 | C18 | 2.00 | 3000 | 5.0 |
| Toner 39 | Pulverization | A12 | C19 | 2.00 | 3000 | 5.0 |
| Toner 40 | Pulverization | A12 | C20 | 2.00 | 3000 | 5.0 |
| Toner 41 | Pulverization | A13 | C21 | 2.00 | 3000 | 5.0 |
| Toner 42 | Pulverization | A13 | C22 | 2.00 | 3000 | 5.0 |

As for each of the toners produced as described above, the respective physical property values determined by the methods described above are shown in Table 6.

TABLE 6

| | | Iron oxide particle | | | SP value difference | |
|---|---|---|---|---|---|---|
| | | Type | Fixing ratio (%) | Aggregated particle diameter (μm) | Binder resin − Releasing agent | Releasing agent − Compound of Formula (1) |
| Example 1 | Toner 1 | C1 | 71 | 0.26 | 2.91 | 1.05 |
| Example 2 | Toner 2 | C2 | 73 | 0.26 | 2.91 | 1.05 |
| Example 3 | Toner 3 | C3 | 72 | 0.26 | 2.91 | 1.05 |
| Example 4 | Toner 4 | C6 | 71 | 0.26 | 2.91 | 0.75 |
| Example 5 | Toner 5 | C7 | 73 | 0.26 | 2.91 | 0.59 |
| Example 6 | Toner 6 | C5 | 72 | 0.26 | 2.91 | 1.05 |
| Example 7 | Toner 7 | C9 | 69 | 0.23 | 2.91 | 1.05 |
| Example 8 | Toner 8 | C10 | 70 | 0.23 | 2.91 | 0.75 |
| Example 9 | Toner 9 | C4 | 69 | 0.26 | 2.91 | 1.05 |
| Example 10 | Toner 10 | C8 | 72 | 0.26 | 2.91 | 0.49 |
| Example 11 | Toner 11 | C11 | 71 | 0.23 | 2.91 | 0.59 |
| Example 12 | Toner 12 | C12 | 72 | 0.23 | 2.91 | 0.49 |
| Example 13 | Toner 13 | C15 | 71 | 0.31 | 2.91 | 0.27 |
| Example 14 | Toner 14 | C16 | 70 | 0.23 | 2.91 | 2.27 |
| Example 15 | Toner 15 | C14 | 73 | 0.23 | 2.91 | 1.32 |

TABLE 6-continued

| | | Iron oxide particle | | Aggregated particle diameter (μm) | SP value difference | |
|---|---|---|---|---|---|---|
| | | Type | Fixing ratio (%) | | Binder resin − Releasing agent | Releasing agent − Compound of Formula (1) |
| Example 16 | Toner 16 | C13 | 69 | 0.23 | 2.91 | 2.80 |
| Example 17 | Toner 17 | C9 | 70 | 0.23 | 3.05 | 0.91 |
| Example 18 | Toner 18 | C9 | 72 | 0.23 | 2.65 | 1.30 |
| Example 19 | Toner 19 | C9 | 73 | 0.23 | 1.97 | 1.05 |
| Example 20 | Toner 20 | C9 | 69 | 0.23 | 1.71 | 1.30 |
| Example 21 | Toner 21 | C9 | 73 | 0.23 | 3.39 | 0.56 |
| Example 22 | Toner 22 | C9 | 72 | 0.23 | 1.59 | 1.42 |
| Example 23 | Toner 23 | C9 | 69 | 0.23 | 1.40 | 1.59 |
| Example 24 | Toner 24 | C13 | 73 | 0.23 | 1.97 | 2.80 |
| Example 25 | Toner 25 | C13 | 65 | 0.23 | 1.97 | 2.80 |
| Example 26 | Toner 26 | C13 | 76 | 0.23 | 1.97 | 2.80 |
| Example 27 | Toner 27 | C13 | 63 | 0.23 | 1.97 | 2.80 |
| Example 28 | Toner 28 | C13 | 60 | 0.23 | 1.97 | 2.80 |
| Example 29 | Toner 29 | C13 | 78 | 0.23 | 1.97 | 2.80 |
| Example 30 | Toner 30 | C13 | 70 | 0.36 | 1.97 | 1.05 |
| Example 31 | Toner 31 | C13 | 50 | 0.36 | 1.97 | 1.05 |
| Example 32 | Toner 32 | C13 | 80 | 0.36 | 1.97 | 1.05 |
| Example 33 | Toner 33 | C13 | 45 | 0.45 | 1.97 | 1.05 |
| Example 34 | Toner 34 | C13 | 90 | 0.36 | 1.97 | 1.05 |
| Example 35 | Toner 35 | C13 | 90 | 0.36 | 2.45 | 0.56 |
| Comparative Example 1 | Toner 36 | C23 | 70 | 0.23 | 2.11 | — |
| Comparative Example 2 | Toner 37 | C17 | 70 | 0.23 | 2.45 | — |
| Comparative Example 3 | Toner 38 | C18 | 70 | 0.23 | 2.45 | — |
| Comparative Example 4 | Toner 39 | C19 | 70 | 0.23 | 1.99 | — |
| Comparative Example 5 | Toner 40 | C20 | 70 | 0.23 | 1.99 | — |
| Comparative Example 6 | Toner 41 | C21 | 70 | 0.23 | 3.39 | — |
| Comparative Example 7 | Toner 42 | C22 | 70 | 0.23 | 3.39 | — |

<Evaluation>

An HP LaserJet Enterprise M609dn in which a process speed was modified to 500 mm/sec was used in consideration of fixability evaluation with a high-speed machine. In addition, modification was performed by connection of an external power source so that a transfer bias was changed, fixing film stains, rubbing fixability, and transfer defects were evaluated as follows.

<Evaluation 1: Evaluation of Fixing Film Stains>

The fixing film stains were evaluated by outputting 3 sheets of solid white images immediately after continuously outputting 50 sheets of solid black images under a normal-humidity and normal-temperature environment, and determining a degree of stains of the solid white image.

When a high-print percent image such as a solid black image is fixed, a part of the toner that cannot be released from the fixing film is attached to the fixing film. When a solid white image is printed immediately thereafter, the toner remaining on the fixing film is transferred to a paper and becomes apparent as stains on the paper.

The solid white image obtained as described above was observed with an optical microscope and evaluated based on the following criteria. The evaluation results are shown in Table 6.

A: No stain was observed.

B: Only a dot with stains was observed.

C: Two or more points with slight stains were observed.

D: Stains were observed, but slight stains were observed on the entire surface or clear stains that were immediately visible were observed.

<Evaluation 2: Evaluation of Rubbing Fixability>

The rubbing fixability was evaluated by outputting a solid black image in a normal-humidity and normal-temperature environment and measuring a density decrease rate before and after rubbing with an eraser.

The rubbing resistance of the fixed image was tested at a load of 300 g using an eraser (trade name: MONO, manufactured by TOMBOW PENCIL CO., LTD.). The density decrease rate of the solid image before and after being rubbed back-and-forth 10 times with the eraser was measured, and the rubbing fixability was evaluated based on the following criteria. The lower the decrease rate, the better the rubbing fixability. The evaluation results are shown in Table 6.

A: The density decrease rate was 0 to 3.0%.

B: The density decrease rate was 3.1 to 10.0%.

C: The density decrease rate was 10.1 to 15.0%.

D: The density decrease rate was 15.1% or more.

<Evaluation 3: Evaluation of Transfer Defect>

Usually, when the transfer bias is high, discharge is likely to occur, and a transfer defect can be strictly evaluated.

In addition, in general, in a case where a thick paper left under a high-humidity environment is used, transferability is strict.

A 1,500-sheet image printing was performed in one-sheet intermittent mode of horizontal lines at a print percentage of 2% at a general transfer bias (0.5 kV) under a high-temperature and high-humidity environment (32.5° C./80% RH) using a thick paper (95 $g/m^2$, manufactured by Canon Inc.). After the 1,500-sheet image printing, one sheet of a solid black image was output. Thereafter, the transfer bias was set to 1.5 kV, and a solid black image was output.

The transfer defect was evaluated by changing the transfer bias to 1.5 kV and visually observing the output solid black image based on the following criteria. The evaluation results are shown in Table 6.

A: The transfer defect was not observed.

B: Density unevenness was partially observed.

C: Density unevenness was observed on the entire surface.

D: White void portions were observed on the black solid image.

TABLE 7

| | | Fixing member staining Rank | Rubbing fixability Rank | Rubbing fixability Density decrease rate (%) | Transfer-ability Rank |
|---|---|---|---|---|---|
| Example 1 | Toner 1 | A | A | 0.7 | A |
| Example 2 | Toner 2 | A | A | 1.3 | A |
| Example 3 | Toner 3 | A | A | 0.7 | A |
| Example 4 | Toner 4 | A | A | 1.3 | A |
| Example 5 | Toner 5 | A | A | 0.7 | A |
| Example 6 | Toner 6 | A | A | 2.5 | A |
| Example 7 | Toner 7 | A | B | 4.0 | A |
| Example 8 | Toner 8 | A | B | 4.0 | A |
| Example 9 | Toner 9 | A | A | 2.0 | A |
| Example 10 | Toner 10 | A | A | 3.0 | A |
| Example 11 | Toner 11 | A | B | 4.0 | A |
| Example 12 | Toner 12 | A | B | 5.3 | A |
| Example 13 | Toner 13 | B | B | 6.0 | A |
| Example 14 | Toner 14 | B | B | 4.3 | A |
| Example 15 | Toner 15 | B | B | 6.7 | A |
| Example 16 | Toner 16 | B | B | 7.0 | A |
| Example 17 | Toner 17 | B | B | 3.3 | A |
| Example 18 | Toner 18 | B | B | 4.0 | A |
| Example 19 | Toner 19 | B | B | 5.3 | A |
| Example 20 | Toner 20 | B | B | 6.7 | A |
| Example 21 | Toner 21 | B | A | 3.0 | A |
| Example 22 | Toner 22 | C | B | 8.5 | A |
| Example 23 | Toner 23 | C | C | 10.6 | A |
| Example 24 | Toner 24 | B | B | 9.0 | B |
| Example 25 | Toner 25 | B | B | 6.7 | A |
| Example 26 | Toner 26 | C | C | 11.3 | B |
| Example 27 | Toner 27 | C | B | 5.3 | A |
| Example 28 | Toner 28 | C | B | 5.3 | A |
| Example 29 | Toner 29 | C | C | 12.7 | B |
| Example 30 | Toner 30 | C | C | 13.1 | C |
| Example 31 | Toner 31 | C | C | 14.0 | B |
| Example 32 | Toner 32 | C | C | 13.3 | C |
| Example 33 | Toner 33 | C | C | 14.3 | C |
| Example 34 | Toner 34 | C | C | 13.7 | C |
| Example 35 | Toner 35 | C | C | 13.7 | C |
| Comparative Example 1 | Toner 36 | D | D | 20.7 | A |
| Comparative Example 2 | Toner 37 | D | D | 19.3 | A |
| Comparative Example 3 | Toner 38 | D | D | 18.5 | A |
| Comparative Example 4 | Toner 39 | D | D | 18.0 | C |
| Comparative Example 5 | Toner 40 | D | D | 20.7 | B |
| Comparative Example 6 | Toner 41 | D | D | 21.2 | B |
| Comparative Example 7 | Toner 42 | C | D | 18.0 | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-199143, filed Nov. 30, 2020, which is hereby incorporated by reference herein in its entirety.

What is claimed is:

1. A toner comprising:

a toner particle containing a binder resin, a releasing agent, and a colorant; and an iron oxide particle present on a surface of the toner particle, wherein the iron oxide particle has a surface containing a compound having a structure represented by the following Formula (1), $$R—SiO_{3/2} \quad (1)$$

wherein, R represents a hydrocarbon group having 1 or more carbon atoms.

2. The toner according to claim 1, wherein a content ratio of the iron oxide particle is 0.10 to 5.00 mass % with respect to a total amount of the toner.

3. The toner according to claim 1, wherein a difference between an SP value $((cal/cm^3)^{1/2})$ of the binder resin and an SP value $((cal/cm^3)^{1/2})$ of the releasing agent is 1.50 or more, the SP value being calculated by a Fedors method.

4. The toner according to claim 1, wherein a difference between an SP value $((cal/cm^3)^{1/2})$ of the releasing agent and an SP value $((cal/cm^3)^{1/2})$ of the compound having a structure represented by Formula (1) is 1.20 or less, the SP value being calculated by a Fedors method.

5. The toner according to claim 1, wherein in an endothermic curve obtained by a measurement using a differential scanning calorimeter (DSC) with both of a temperature increasing rate and a temperature decreasing rate of 100° C./min, a half-value width of an endothermic peak in a second temperature increasing process is 4.0 to 8.0° C.

6. The toner according to claim 1, wherein when 0.1 g of the iron oxide particle is suspended in 50 mL of a methanol/water mixed solvent, a transmittance of light having a wavelength of 780 nm is measured, and a value of a methanol concentration when the transmittance is 50% is defined as wettability of the iron oxide particle, the wettability is 40 to 80 vol %.

7. The toner according to claim 1, wherein in a Fourier-transform infrared (FT-IR) spectrum of a component extracted from the iron oxide particle with toluene, a ratio [Si—O—Si]/[Si—C] of a maximum absorption peak intensity [Si—O—Si] in a range of 990 to 1,040 $cm^{-1}$ to a maximum absorption peak intensity [Si—C] in a range of 1,240 to 1,280 $cm^{-1}$ is 1.4 to 1.7.

8. The toner according to claim 1, wherein when a near edge X-ray absorption fine structure (NEXAFS) of the iron oxide particle is observed by a measurement by a total electron yield (TEY) method using soft X-rays, an obtained absorption spectrum of Si has a peak A in a range of 1,844.4 to 1,844.8 eV and a peak B in a range of 1,846.1 to 1,846.6 eV, and IA/(IA+IB)/MSi is 40 to 55 g/mol, the IA being an area of the peak A, the IB being an area of the peak B, and the MSi being the number of moles of Si derived from a silane compound contained in 1 g of the iron oxide particle.

* * * * *